(12) United States Patent  
Kawada

(10) Patent No.: US 7,438,042 B1
(45) Date of Patent: Oct. 21, 2008

(54) METHOD OF STOPPING INTERNAL COMBUSTION ENGINE

(75) Inventor: Takuji Kawada, Canton, MI (US)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 11/749,891

(22) Filed: May 17, 2007

(51) Int. Cl.
*B60R 25/04* (2006.01)

(52) U.S. Cl. ............... 123/198 B; 701/112; 123/179.4

(58) Field of Classification Search ............ 123/179.4, 123/198 B, 198 DB, 481, 90.11, 90.15, 345, 123/346, 347; 701/112, 103, 104
See application file for complete search history.

(56) References Cited

U.S. PATENT DOCUMENTS

| | | | | |
|---|---|---|---|---|
| 7,047,126 | B2 * | 5/2006 | Lewis ........................ | 701/112 |
| 7,059,297 | B2 * | 6/2006 | Kataoka et al. ............. | 123/322 |
| 7,167,792 | B1 * | 1/2007 | Kolmanovsky et al. ..... | 701/112 |
| 7,240,663 | B2 * | 7/2007 | Lewis et al. ................. | 123/321 |
| 7,317,984 | B2 * | 1/2008 | Lewis ........................ | 701/112 |

FOREIGN PATENT DOCUMENTS

| | | |
|---|---|---|
| JP | 2002-213261 A | 7/2002 |
| JP | 2004-308570 A | 11/2004 |

* cited by examiner

*Primary Examiner*—Stephen K. Cronin
*Assistant Examiner*—Hyder Ali
(74) *Attorney, Agent, or Firm*—Alleman Hall McCoy Russell & Tuttle LLP

(57) ABSTRACT

There is provided a method of stopping an internal combustion engine having a combustion chamber and an intake valve which opens during an intake stroke of an engine cycle to allow air to be inducted into the combustion chamber. The method comprises advancing closing timing and reducing a lift of the intake valve to reduce air charged in said combustion chamber and shutting off fuel to the combustion chamber upon a request of engine stop, maintaining a speed of the internal combustion engine within a predetermined range without supplying fuel to the combustion chamber and with the advanced closing timing and the reduced lift of the intake valve at least for one intake stroke of the combustion chamber, and decreasing the speed of the internal combustion engine with the advanced closing timing and the reduced valve lift of the intake valve from the predetermined range. Accordingly, the air in the combustion chamber can be quickly reduced so that the engine can be stopped without a substantial vibration caused by the compression of the air in the combustion chamber. Therefore, the period to keep the engine speed above the predetermined value can be made shorter so that the energy consumed for that, for example, electric power to operate an electric machine to drive the engine, can be reduced.

20 Claims, 18 Drawing Sheets

METHOD OF STOPPING INTERNAL COMBUSTION ENGINE

BACKGROUND

The present description relates to an internal combustion engine, more particularly relates to a method of stopping an internal combustion engine with suppressed vibration during engine stopping.

There is shown and presented, for example in Japanese patent application publication no. 2004-308570A, a method of stopping an engine of a hybrid electric vehicle. Generally, the hybrid electric vehicle more frequently stops and restarts the engine, and therefore, when stopping the engine, it requires smoother engine stop operation. Particularly, the method of '570 publication seeks suppression of a vibration caused by compression of air in the combustion chamber just before the complete stop of the engine rotation. When an engine stop request is issued, fuel is shut off to the combustion chamber, and an electric machine drives the engine with advanced intake valve timing in order to purge air in a surge tank of the engine and keep an engine speed. When the pressure in the surge tank is sufficiently reduced, it is stopped to keep the engine speed, and the intake valve timing is retarded in order to reduce an effective compression ratio by reducing air charge in the combustion chamber with the retarded intake valve timing.

Therefore, at the second stage of the motoring the engine, the reduced effective compression ratio may suppress the vibration caused by the compression of air. However, according to the prior art method, it may take substantial period of time to purge the air in the combustion chamber and electric energy to operate the electric machine to keep the engine speed during the first stage. Therefore, there is a need to improve the method of stopping the internal combustion engine of the prior art.

SUMMARY

Accordingly, there is provided, in one aspect of the present description, a method of stopping an internal combustion engine having a combustion chamber and an intake valve which opens during an intake stroke of an engine cycle to allow air to be inducted into the combustion chamber. The method comprises advancing closing timing of the intake valve to reduce air charged in said combustion chamber and shutting off fuel to the combustion chamber upon a request of engine stop, maintaining a speed of the internal combustion engine within a predetermined range without supplying fuel to the combustion chamber and with the advanced closing timing of the intake valve at least for one intake stroke of the combustion chamber, and decreasing the speed of the internal combustion engine with the advanced closing timing of the intake valve from the predetermined range.

According to the first aspect, by advancing the closing timing to reduce the air charged in the combustion chamber and maintaining the speed of the internal combustion engine within the predetermined range with the advanced closing timing of the intake valve, the air in the combustion chamber can be quickly reduced so that the engine can be stopped without a substantial vibration caused by the compression of the air in the combustion chamber. Therefore, the period to keep the engine speed above the predetermined value can be made shorter so that the energy consumed for that, for example, electric power to operate an electric machine to drive the engine, can be reduced.

The lift of the intake valve may be a maximum valve lift or duration of valve lifting or opening. In the latter case, if the opening timing of the valve is substantially constant, the closing timing is advanced as the lift is reduced.

There is provided, in a second aspect of the present description, a method of stopping the internal combustion engine, comprising reducing a lift of the intake valve and shutting off fuel to the combustion chamber upon a request of engine stop, maintaining a speed of the internal combustion engine within a predetermined range without supplying fuel to the combustion chamber and with the reduced lift of the intake valve at least for one intake stroke of the combustion chamber, and decreasing the speed of the internal combustion engine with the reduced lift of the intake valve from said predetermined range. Accordingly, by reducing the lift of the intake valve and keeping the engine speed within the predetermined range with the reduced valve lift, the air charged in the combustion chamber can be quickly reduced so that the energy consumed to maintain the engine speed can be reduced.

There is provided, in a third aspect of the present description, a power-train system comprising an internal combustion engine with a plurality of combustion chambers having intake valves which opens during an intake stroke of an engine cycle to allow air to be inducted into each of the combustion chambers, a variable valve lift mechanism capable of variably setting lifts of the intake valves, a fuel supply system configured to supply fuel individually to the combustion chambers, a first rotational machine capable of converting rotational power from first energy and rotationally coupled to the internal combustion engine, and a controller. The controller is configured to control the variable valve mechanism to reduce the lifts of the intake valves and the fuel supply system to shut off fuel to the combustion chambers upon a request of engine stop, regulate the first energy to maintain a speed of the internal combustion engine within a predetermined range and decrease it after intake strokes for all of the combustion chambers have taken place.

According to the third aspect, by reducing the lift of the intake valves and keeping the engine speed within the predetermined range with the reduced valve lift until intake strokes for all of the combustion chambers have taken place, the air charged in the combustion chambers can be quickly reduced so that the first energy consumed to maintain the engine speed can be reduced.

BRIEF DESCRIPTION OF THE DRAWINGS

The advantages described herein will be more fully understood by reading an example of embodiments in which the above aspects are used to advantage, referred to herein as the Detailed Description, with reference to the drawings wherein.

DETAILED DESCRIPTION

Figure 1:
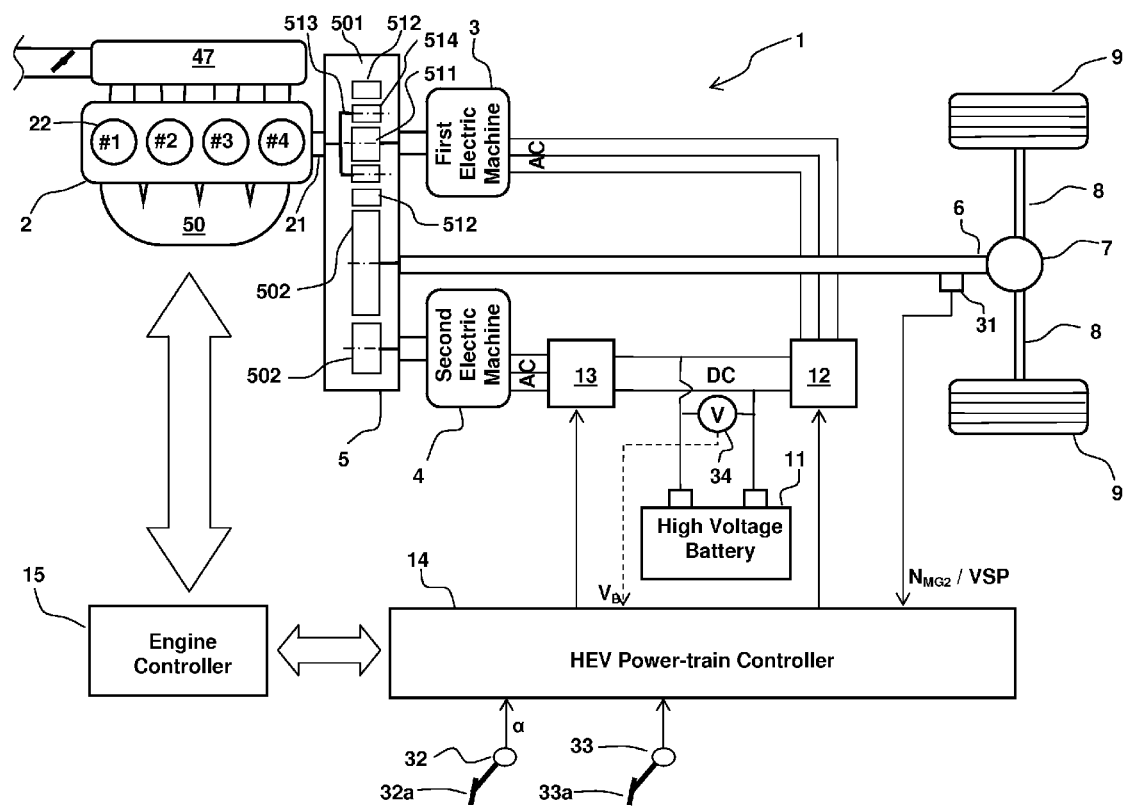
FIG. 1 is a schematic diagram illustrating a series-parallel hybrid electric (HEV) power-train system according to an embodiment of the present description.

Embodiments of the present description will now be described with reference to the drawings, starting with FIG. 1, which illustrates a schematic diagram of an entire system of a series-parallel hybrid electric vehicle (HEV) power-train 1. The series-parallel HEV power-train 1 comprises an internal combustion engine 2, a first electric machine 3, and a second electric machine 4. These three rotational machines 2 through 4 are rotationally connected to a power transmission mechanism 5.

The power transmission mechanism 5 comprises a planetary gear set 501, a driven gear 502, and a second driving gear 503. The planetary gear set 501 comprises a sun gear 511, a ring gear 512, and a planetary carrier 513 carrying planetary pinions 514 thereon, all of which are engaged with each other in the known manner. The ring gear 512 has not only inner teeth that engage with the planetary pinions 514, but also outer teeth that engage with the driven gear 502. The driven gear 502 is also engaged with the second driving gear 503. The power transmission mechanism does not have any clutch so that the all rotational elements are permanently engaged with each other.

The crankshaft 21 of the engine 2 is permanently coupled to the planetary carrier 513. A rotational shaft of the first electric machine 3 is permanently coupled to the sun gear 511 which functions as a driving gear for the first electric machine 3. A rotational shaft of the second electric machine 4 is permanently coupled to the second driving gear 503. The driven gear 502 is permanently coupled through a final drive-train, for example, including a propeller shaft 6, a differential gear set 7 and drive shafts 8, as known in the art, to driving wheels 9. In the illustrated embodiment, the driving wheels 9 are vehicle rear wheels, but they may be vehicle front wheels for front wheel drive vehicles.

The first and second electric machines 3 and 4 are three-phase induction motor generators (MGs) known in the art. They are electrically connected to a high voltage battery 11 through first and second inverters 12 and 13 respectively. The first electric machine 3 can rotate and generate alternate current (AC), which is output through three AC power lines to the first inverter 12. There, the electricity in the form of AC is converted to direct current (DC), and output to DC power lines. When the electricity is supplied to the first electric machine 3 in the opposite direction, it may generate torque to drive the engine 2, such as for an engine start.

The second inverter 13 receives electricity in the form of DC from the DC power lines, and converts the electricity from DC to AC. The second electric machine 4 can generate torque with the AC electricity from the second inverter 13 through three AC power lines, and output the torque to the driving wheels 5 through the power transmission mechanism 5, in particular the second driving gear 503 and the driven gear 502, and the final drive-train. Also, such as when the vehicle is decelerating, rotational inertia on the driving wheels 5 can rotate the second electric machine 4, which can generate electricity in the form of AC and output it to the second inverter 13 through the three AC power lines.

The first and second inverters 12 and 13 are connected with each other by the DC power lines, which are respectively connected to positive and negative terminals of the battery 11, so that direct currents can flow in any directions between the three electrical elements 11 through 13 in dependence on their terminal voltages.

A HEV controller 14 controls first and second inverters 12 and 13, and eventually the first and second electric machines 3 and 4. Specifically, the HEV controller 14 is a microcomputer based controller having a central processing unit which executes programs using data, memories, such as RAM and ROM, storing the programs and data, and input/output (I/O) bus inputting and outputting electric signals, as is well known in the art. More specifically, the controller 14 computes desired amounts of the respective input/outputs of the first and second electric machines 12 and 13 based on various inputs. The inputs include signals from a speed sensor 31 for detecting a speed $N_{MG2}$ of the second electric machine 4 corresponding to a vehicle speed VSP, an accelerator position sensor 32 for detecting a position a of an accelerator pedal 32a, a brake switch 33 for detecting a depression of a brake pedal 33a by a vehicle operator, a battery voltage sensor 34 for detecting a terminal voltage $V_B$ of the battery 11, first through third current sensors (not shown) for respectively detecting electric currents flowing to/from the first inverter 12, the second inverter 13 and the battery 5, and other sensors. The HEV controller also communicates with an engine controller 15, which is described in greater detail below.

Figure 2:
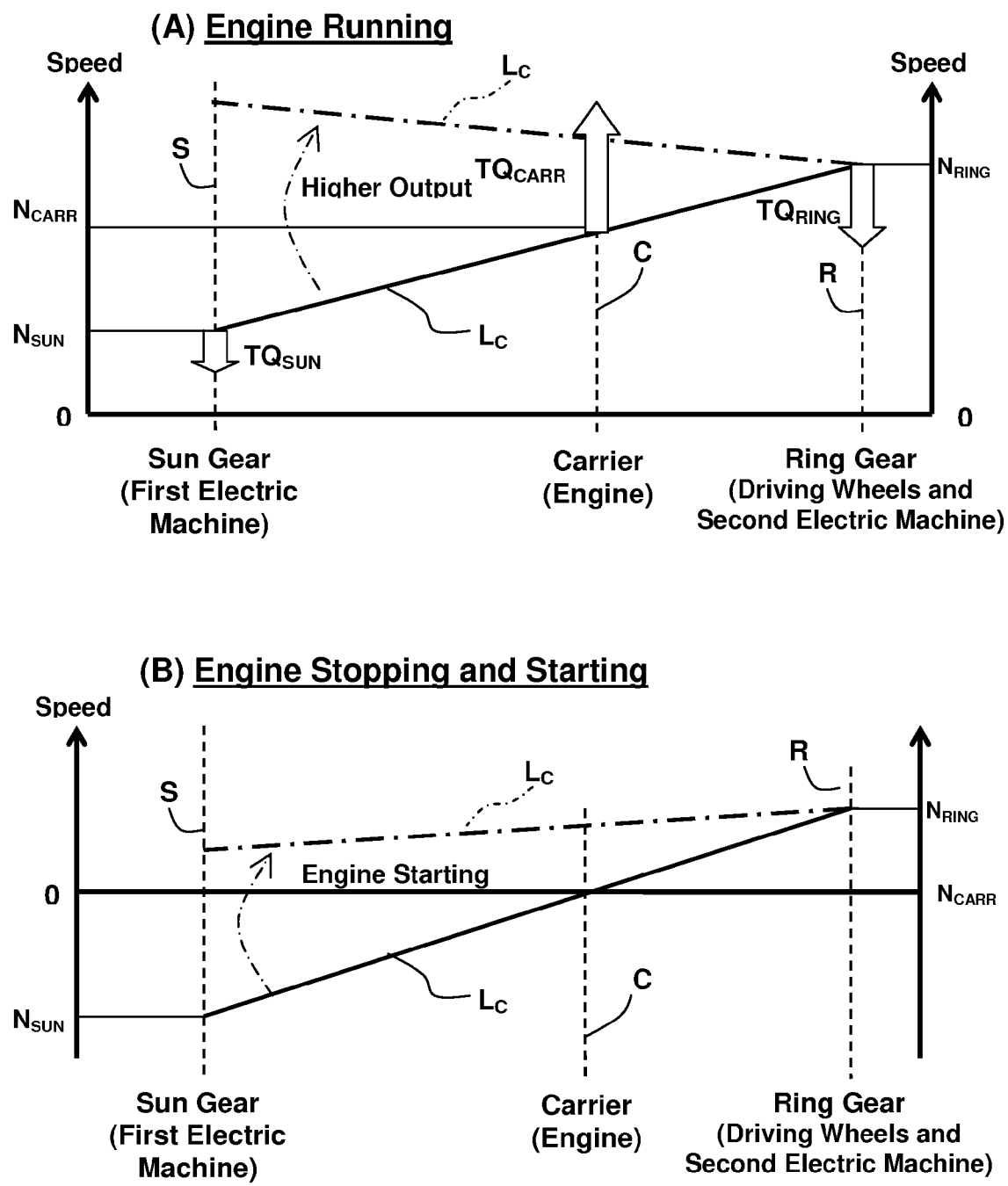
FIG. 2 shows collinear diagrams of a planetary gear set of the HEV power-train of FIG. 1, illustrating relationships between rotational speeds of three rotational elements of the planetary gear sets in an engine running state (A) and an engine stopping and starting state (B)

There is shown, in FIG. 2, a collinear diagram of the planetary gear set 501 of the power transmission mechanism 5. A speed $N_{RING}$ of the ring gear 512 is fixedly in proportion to the vehicle speed VSP and the speed $N_{MG2}$ of the second electric machine 4 through the driven gear 502 and the second driving gear 503. Speeds $N_{SUN}$ and $N_{CARR}$ of the sun gear 511 and the planetary carrier 513 are fixedly in proportion respectively to speeds $N_{ENG}$ and $N_{MG1}$ of the engine 2 and the first electric machine 3. As is well known in the art, the planetary gear set 501 puts those speeds $N_{RING}$, $N_{SUN}$ and $N_{CARR}$ at crossing points between a collinear line $L_C$ and vertically lines R, S and C respectively. The collinear line $L_C$ varies its position and inclination (in other words, speed ratios between the three rotational elements) depending on torque applied on the three rotational elements of the planetary gear set 501.

When the engine 2 is running as shown in FIG. 2(A), it applies torque $TQ_{CARR}$ on the planetary carrier 513, and the torque $TQ_{CARR}$ is divided ring gear torque $TQ_{RING}$ and sun gear torque $TQ_{SUN}$ which are applied on the ring gear 512 and the sun gear 511 respectively and reaction torques of which are illustrated in FIG. 2(A). The ring gear torque $TQ_{RING}$ reaches eventually at the driving wheels 9. The sun gear torque drives the first electric machine 3, which, under control of the HEV controller 14 through the first inverter 12, generates electric power $P_{MG1}$ in accordance with the speed $N_{SUN}$ and the torque $TQ_{SUN}$. The electric power $P_{MG1}$ which the first electric machine 3 generates is supplied to the second electric machine 4 and/or to the battery 11 for its charging through the first and second inverters 12 and 13 under the control of the HEV controller 14.

In a case where all the electric power $P_{MG1}$ is supplied to the second electric machine 4, all the power the engine 2 generates can be considered supplied to the driving wheels 9 if the power transmission loss is ignored. Then, the speed ratio between the engine 2 and the driving wheels 9 can be continuously varied depending on the torque relationship between the three rotational elements of the planetary gear set 501. For example as shown in FIG. 2(A), the sun gear speed $N_{SUN}$ is increased by decreasing the sun gear torque $TQ_{SUN}$ while the other torque is constant and causing a torque imbalance until the equilibrium of torque is obtained as shown by a one-dotted line for the collinear line $L_C$, and the carrier speed $N_{CARR}$ is increased accordingly. Therefore, in that case, the power transmission mechanism 5 varies a speed ratio continuously, in other words, functions as a continuously variable transmission.

On the other hand, when, as shown by a solid line $L_C$ of FIG. 2(B), the engine 2 is stopped and the second electric machine 4 solely drives the driving wheels 9 with the electric power from the battery 11, the ring gear 512 rotates at a speed $N_{RING}$ which corresponds to the vehicle speed VSP and the speed $N_{MG2}$ of the second electric machine 4. But, the engine 2 does not rotate at all due to resistive force that moving parts of the engine generate, and the carrier speed $N_{CARR}$ is zero. While the ring gear 512 rotates and the carrier 513 does not, the sun gear 511 rotates in the opposite direction if no torque is applied, in other words, the torque $TQ_{SUN}$ is zero.

From the condition of the solid line $L_C$ of FIG. 2(B), by generating electricity from the first electric machine 3 and then supplying electricity to the first electric machine 3 after the rotation of the sun gear 511 changes its direction, the engine 2 is started to rotate as shown by a one-dotted line of the collinear line $L_C$. When the vehicle is stopped, in other words the ring gear speed $N_{RING}$ is zero, the engine can be rotated simply by supplying electric power to the first electric machine 3.

Figure 3:
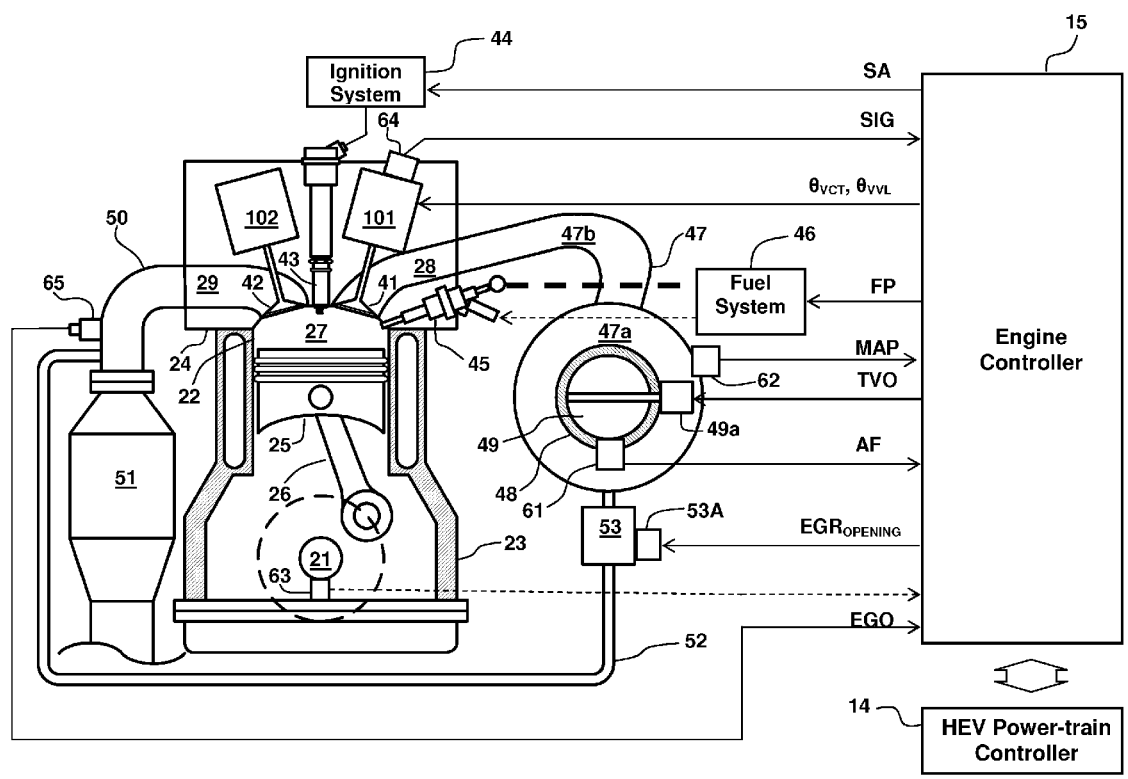
FIG. 3 is a schematic diagram illustrating an internal combustion engine consisting part of the HEV power-train of FIG. 1.

The internal combustion engine 2 is a four cylinder four stroke engine in the present embodiment. Therefore, it has four cylinders 22 (#1 through #4 cylinders in FIG. 1), although it may have any number of cylinders. Referring to FIG. 3 for greater detail, the engine 2 comprises a cylinder block 23, and a cylinder head 24, which is arranged on the cylinder block 23. The cylinder block 23 and cylinder head 24 integrally form the cylinders 22. The cylinder 22 accommodates a piston 25 which slides therein. As is well known in the art, the cylinder block 22 rotationally supports a crankshaft 21 using journals, bearings and the like. Further, a connecting rod 26 links the crankshaft 21 and the piston 25. The cylinder head 24, the cylinder 22, and the piston 25 collectively form a combustion chamber 27 inside.

Although only one is illustrated in FIG. 1, two intake ports 28 are formed in the cylinder head 24, and respectively open to the combustion chamber 27. Likewise, two exhaust ports 29 are formed in the cylinder head 23, and respectively open to the combustion chamber 27. Intake valves 41 and exhaust valves 42 are respectively capable of shutting the intake ports 28 and the exhaust ports 29 from the combustion chamber 27 as shown in FIG. 2. A valve drive mechanism 101 causes each of the intake valves 41 to make reciprocating movement at desired timing. Likewise, a valve drive mechanism 102 causes each of the exhaust valves 42 to make a reciprocating movement at desired timing. The valve drive mechanism 101 will be described later in greater detail.

A spark plug 43 is mounted to the cylinder head 24 in the well known manner such as threading. An ignition circuit or system 44 receives a control signal SA from the engine controller 15, and provides electric current to the spark plug 43 so that it makes a spark at desired ignition timing.

A fuel injector 45 is mounted to the cylinder head 24 at one side of a cylinder center axis in a known manner such as using a mounting bracket. A tip end of the injector 45 faces the inside of the combustion chamber 27 from a space vertically below and horizontally between the two intake ports 28. A fuel supply system 46 includes a high pressure pump and an injector driver circuit not shown, and supplies fuel from a fuel tank not shown as is well known in the art. Also, the fuel supply system 46, particularly an injector driver circuit therein, activates a solenoid of the injector 45 to open the spray nozzles in accordance with a control signal corresponding to a fuel injection pulse FP from the engine controller 15, in order to inject desired amount of fuel at desired timing.

The intake ports 28 connect in fluid communication to a surge tank 47a through intake passages 47b of an intake manifold 47. Air flows from an air cleaner not shown to the surge tank 47a through a throttle body 48, in which a throttle valve 49 is arranged. The throttle valve 49 pivots and regulates airflow to the surge tank 47a, as is well known in the art. A throttle actuator 49a adjusts an opening of the throttle valve 49 in accordance with a control signal TVO from the engine controller 15.

The exhaust ports 29 connect to an exhaust manifold 50, and eventually are in fluid communication with an exhaust pipe in a manner known in the art. Downstream of the exhaust manifold 50 in an exhaust gas passage, an exhaust gas purification system having one or more of catalyst converters 51 is arranged. The catalyst converter 51 may comprise a conventional three way catalyst, a lean NOx trap, an oxidation catalyst or any other type of catalyst that conforms to exhaust gas purification needs of the specific fuel control strategy.

For exhaust gas recirculation, an EGR pipe 52 connects the intake manifold 47, downstream of the throttle valve 49, and the exhaust manifold 50 in fluid communication. Pressure at the exhaust side is higher than at the intake side, so that exhaust gas flows into the intake manifold 47 and mixes with the fresh air inducted from the intake manifold 47 into the combustion chamber 27. An EGR valve 53 is arranged in the EGR pipe 52 and regulates the EGR flow. An EGR valve actuator 53a adjusts an opening of the EGR valve 53 in accordance with a control signal $EGR_{OPENING}$ from the engine controller 15.

Figure 4:
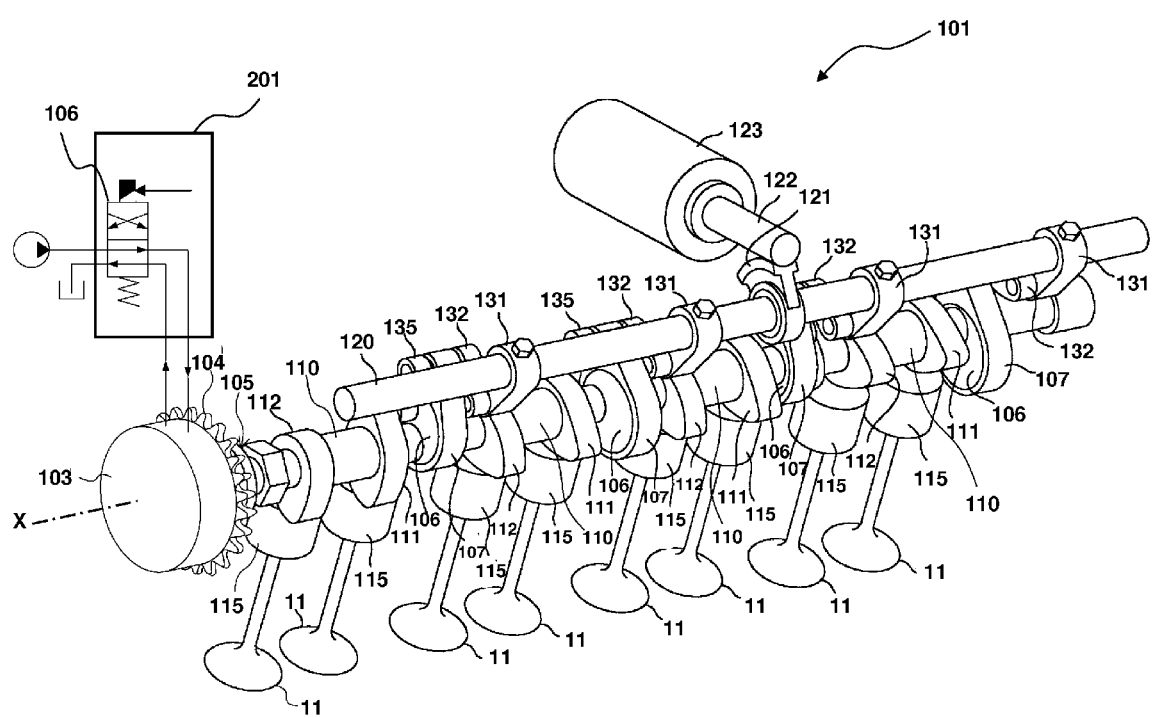
FIG. 4 shows a perspective view of an intake valve drive mechanism including a variable cam timing mechanism and a variable valve lift mechanism in accordance with the embodiment.

Referring to FIG. 4, the valve drive mechanism 101 for the intake valves 11 will now be described in greater detail. Referring to FIG. 3, there is shown the valve drive mechanism 101 for the intake valves 41. The valve drive mechanism 102 for the exhaust valves 12 has a same construction as for the intake in the present embodiment. Therefore the specific description for the mechanism 102 will be omitted. Alternatively, the valve drive mechanism 102 for the exhaust valves may be of a conventional overhead camshaft (OHC) type. The OHC type valve drive mechanism comprises a cam for pushing a valve stem, a camshaft integrally forming the cam, and a camshaft drive-train such as chain and sprocket for transmitting rotational movement of the crankshaft 6 to the camshaft, as is well known in the art.

The valve drive mechanism 101 has a variable cam timing (VCT) mechanism 103, which is linked to the crankshaft 21 through a chain drive mechanism including a driven sprocket 104, a drive sprocket at the crankshaft 21, and a chain not shown and engagingly wounded around the drive and driven sprockets. The VCT mechanism 103 comprises a casing, which is affixed to the sprocket 104 to rotate with it, and a rotor, which is affixed to an inner shaft 105 and rotates with it. Between the casing and the rotor of the VCT mechanism 103, there are formed a plurality of hydraulic chambers, which are circumferentially arranged around the rotational axis X. Fluid pressurized by a pump, such as engine oil, is selectively supplied to each of the hydraulic chambers to make a pressure difference between the opposing chambers. A VCT control system 201 including an electromagnetic valve 106 adjusts the hydraulic fluid supplied to the chambers. The electromagnetic valve 106 cyclically switches hydraulic acting directions to the chambers in a duty ratio in accordance with a control signal $\theta_{VCT}$ from the engine controller 100 and an actual phase difference between the sprocket 104 and the inner shaft 105, thereby achieving a desired rotational phase of the inner shaft 105, as is known in the art.

Still referring to FIG. 4, the inner shaft 105 has an eccentric disc-shaped cam 106 for each of the cylinders 22. The eccentric cam 106 is formed integrally but not coaxially with the inner shaft 105 and rotates at a phase defined by the VCT mechanism 103. Freely rotationally fitted around the eccentric disc 106 is an inner surface of a ring arm 107. Therefore, the ring arm 107 can self rotate about a center axis Y of the eccentric cam 106 (only shown in FIG. 6) and orbit around the rotational axis X, as the inner shaft 105 rotates about the rotational axis X.

Figure 5:
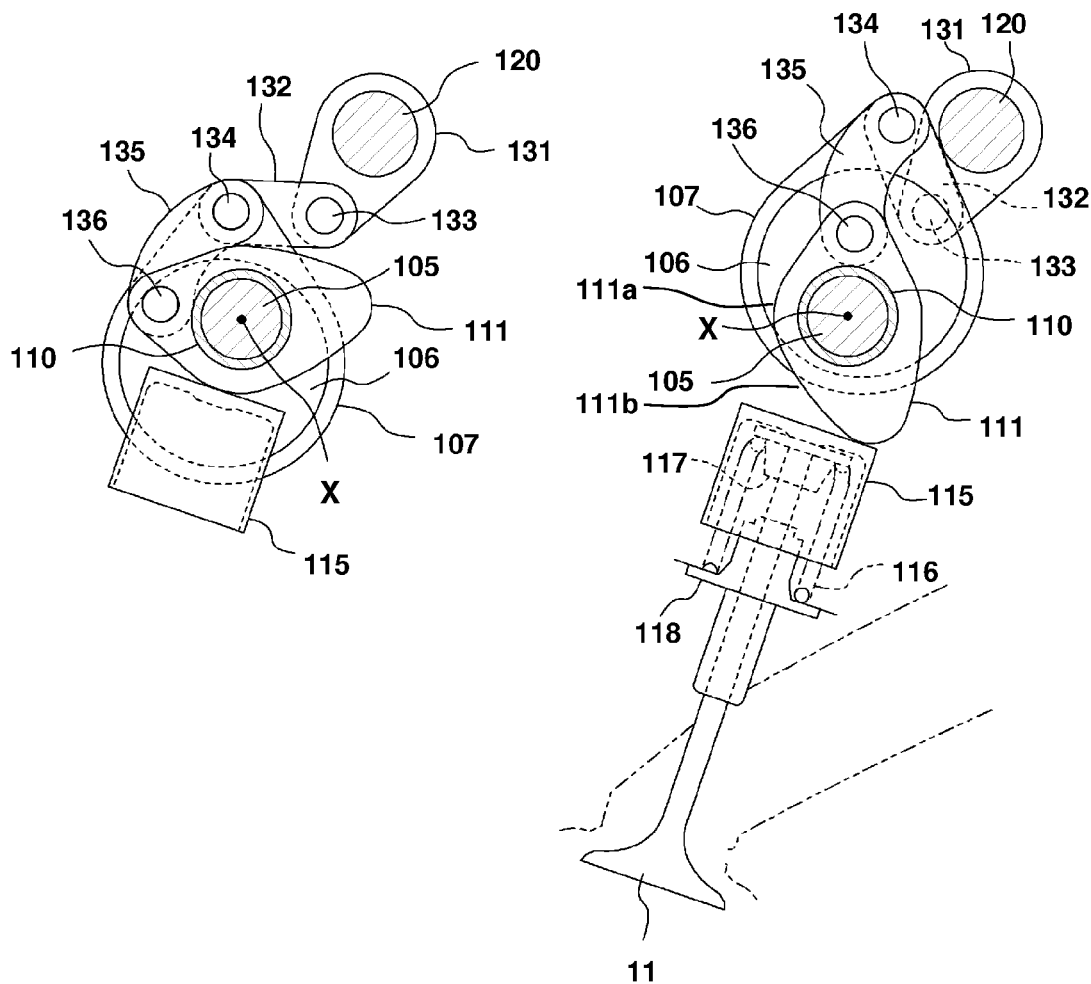
FIG. 5 shows a side view of the variable valve lift mechanism for a valve open state (1) and a valve closed state (2) with a greater valve lift in accordance with the embodiment.

Arranged around the inner shaft 105 is a rocker connector 110 for each of the cylinders 22. The rocker connector 110 pivots coaxially with the inner shaft 105, in other words, about the axis X, and integrally forms first and second rocker cams 111 and 112. The rocker connector 110 forms a bearing journal at its outer circumferential surface, so that a bearing cap not shown arranged on the cylinder head 24 can rotationally support the rocker cam parts 110 through 112. As shown in FIG. 5, each of the rocker cams 111 and 112 has a cam surface 111a and a basic circular surface 111b, either of which contacts to an upper surface of a tappet 115, as a conventional valve drive cam does, except that the rocker cams do not continuously rotate, but rocks. The tappet 115 is supported by a valve spring 116, which is sustained between retainers 117 and 118, as is known in the art.

Referring back to FIG. 4, arranged above and in parallel with the assembly of inner shaft 105 and the rocker cam parts 110 through 112 is a control shaft 120, which is rotationally supported by bearings not shown. The control shaft 120 integrally forms a worm gear 121 coaxially at its outer peripherally. The worm gear 121 engages with a worm 122, which is affixed to an output shaft of an electric motor 123. Therefore, the motor 123 may rotate the control shaft 120 to its desired position, in accordance with a control signal $\theta_{VVL}$ from the engine controller 15, and hereinafter is referred to as a VVL actuator.

Four control arms 131 for the respective cylinders 22 are attached to the control shaft 120, so that the control arms 131 can pivot integrally with the control shaft 120. A control link 132 couples each of the control arms 131 and the respective ring arm 107 through a control pivot 133 and a common pivot 134. Then, a rocker link 135 couples the ring arm 107 and the first cam 111 through the common pivot 134 and a rocking pivot 136.

FIG. 5 and FIG. 7(A) show a condition where a valve lift is greater. The control arm 131 is adjusted to define a VVL control angle $\theta_{VVL\_A}$ between the horizontal plane shown by a dotted line in FIG. 6(A) and a line connecting the center axes of the control shaft 120 and the control pivot 133.

When the inner shaft 105 rotates about the axis X clockwise on the sheet of Figures from a no-lift state (1) to a maximum-lift state (2) in FIG. 5 or from a state shown by broken lines to a state shown by solid lines in FIG. 7(A), the common center Y of the eccentric cam 106 and the ring arm 107 orbits clockwise from points $Y_{1A}$ to $Y_{2A}$ about the axis X as shown in FIG. 7(A). The orbital movement of the ring arm 107 causes a rocking movement of the control link 132 by an angle $\theta_{132A}$ about the control pivot 132 due to a first four-link relationship consisting of four pivots X, Y, 133 and 134 and the corresponding links. Therefore, the common pivot 134 rocks about the control pivot 133. The common pivot 134 is at its rotational end positions when the axis X, the common center Y and the common pivot 134 are in line. One of the end positions of the common pivot 134 is shown by the solid lines in FIG. 7(A).

Four pivots 133, 134, 136 and X and corresponding links consist a second four-link relationship. It converts the rocking movement of the common pivot 134 by the angle $\theta_{132A}$ to a rocking movement of the rocker cam 111 or 112 by an angle $\theta_{111A}$ about the axis X. When the common center Y is located at $Y_{A1}$, the cam 111 is at one of its angular end positions because the common pivot is at its rotational end as described above and as shown in FIG. 7(A).

When the cam surface 111a of the rocker cam 111 or 112 contacts the tappet top surface 115a as in the state (2) of FIG. 5 and as shown by the solid line in FIG. 7(A), the rocker cam 111 or 112 moves down the tappet 115 against the valve spring 116. Then, the tappet 115 causes the intake valve 41 to move down to its maximum valve lift under the angle $\theta_{VVL}$ A of the control arm 131 in FIG. 7(A).

On the other hand, when the basic circular surface 111b contacts the tappet top surface 115a as shown in the state (1) of FIG. 5 and by the broken line in FIG. 7(A), the tappet 115 is not pushed down, because the basic circular surface 111b has a constant radius smaller than a distance between a point of the cam surface 111a and the axis X. Therefore, the angle $\theta_{VVL\_A}$ or the angular position of the control arm 131 causes a valve lift $h_A$ as shown in FIG. 7(A).

Figure 6:
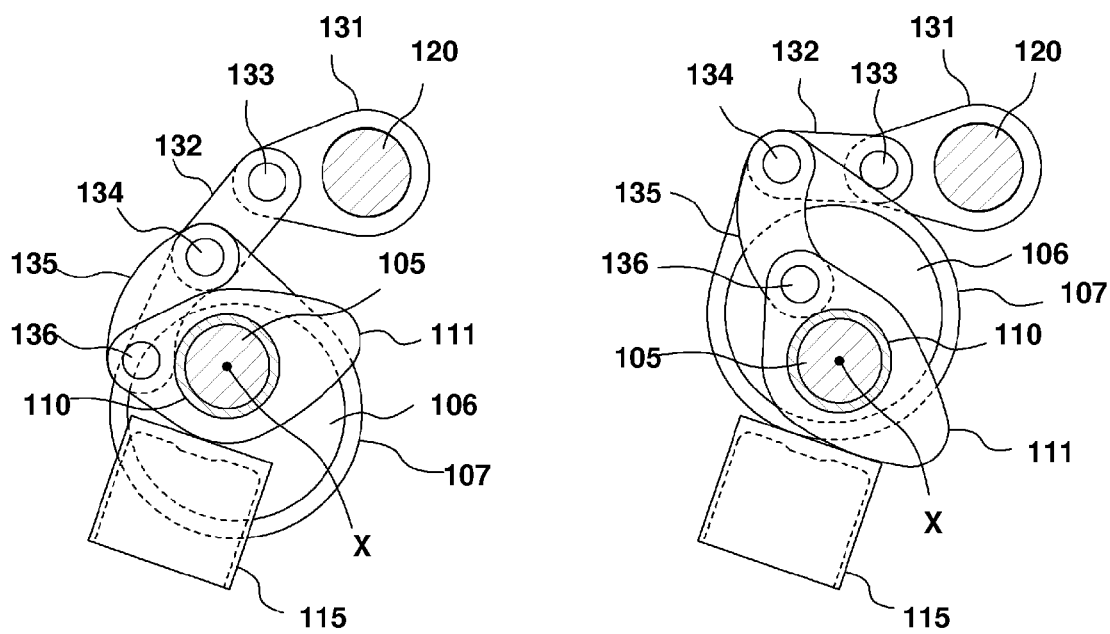
FIG. 6 shows a side view of the variable valve lift mechanism for a valve open state (1) and a valve closed state (2) with a smaller valve lift in accordance with the embodiment.

FIGS. 6 and 7(B) show a condition of smaller valve lift $h_B$. The control arm 131 is adjusted to define an angle $\theta_{131B}$ between the horizontal plane shown by the dotted line and the line connecting the center axes of the control shaft 120 and the control pivot 133 as shown in FIG. 7(B). In this Figure, as the inner shaft 105 rotates clockwise, the common center Y orbits from points $Y_{1B}$ to $Y_{2B}$. For the illustrative purpose, the point $Y_{1B}$ is the same point as $Y_{1A}$ in FIG. 7(A). The position $Y_{2B}$ is one of angular end positions where the axis X, the common center Y and the common pivot 133 are in line.

The first four-link relationship consisting of the pivots X, Y, 133 and 134 and the others causes an angular movement of the control link 132 by an angle $\theta_{132B}$. Then, the second four-link relationship consisting of the pivots 133, 134, 136 and X converts the angular movement of the control link 132 or the common pivot 134 into a rocking movement of the rocking cam 111 or 112 with an angle $\theta_{111B}$. When the common center Y is located at $Y_{B1}$, the cam 111 is at one of its angular end positions because the common pivot Y is at its rotational end as described above and as shown in FIG. 7(B).

Figure 7:
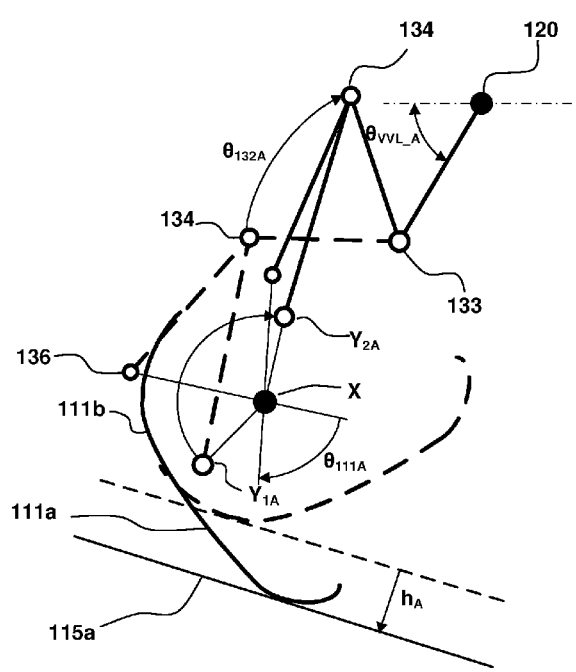
FIG. 7 is explanatory diagrams for the greater valve lift (A) and the smaller valve lift (B) respectively illustrated in FIGS. 4 and 5.
Figure 7:
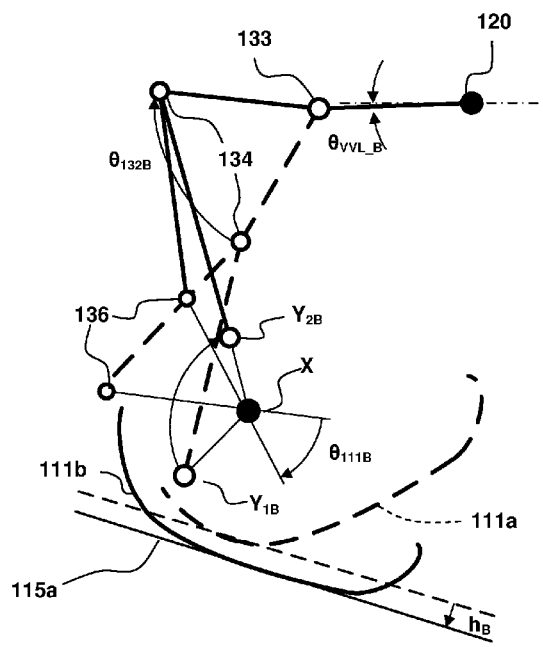

When the basic circular surface 111b contacts tappet top surface 115a as shown in the state (1) of FIG. 6 and by the broken line in FIG. 7(B), the tappet 115 is not pushed down as in the case of FIG. 7(A). When the cam 111 is positioned as shown by the solid line in FIG. 7(B), the cam surface 111a contacts the tappet top surface 115a and pushes down the tappet 115 most under the angular position $\theta_{131B}$ of the control arm 131. As can be seen from FIG. 7, a valve lift $h_B$ is much smaller than the valve lift $h_A$. Therefore, as the angle $\theta_{VVL}$ is smaller, the peak valve lift h decreases. If the angle $\theta_{VVL}$ is further increased, the valve lift can be zero depending on the configuration of a variable valve lift (VVL) mechanism.

Further, as the angle $\theta_{VVL}$ is smaller, the rocking angle $\theta_{111}$ decreases, and the angular position $Y_2$ of the common center Y, with which the maximum valve lift is obtained, shifts counterclockwise. These can be seen from valve lift curves in FIG. 8. A valve lift curve $L_A$ illustrates the greater valve lift state with the angle $\theta_{VVL\_A}$ shown in FIGS. 5 and 7(A), and a valve lift curve $L_B$ illustrates the smaller valve lift state with the angle $\theta_{VVL\_B}$ shown in FIGS. 6 and 7(B), for a case where only the VVL actuator 123 is operated with the VCT mechanism 103 setting the inner shaft 105 at a fixed angular phase with respect to the crankshaft 21.

Figure 8:
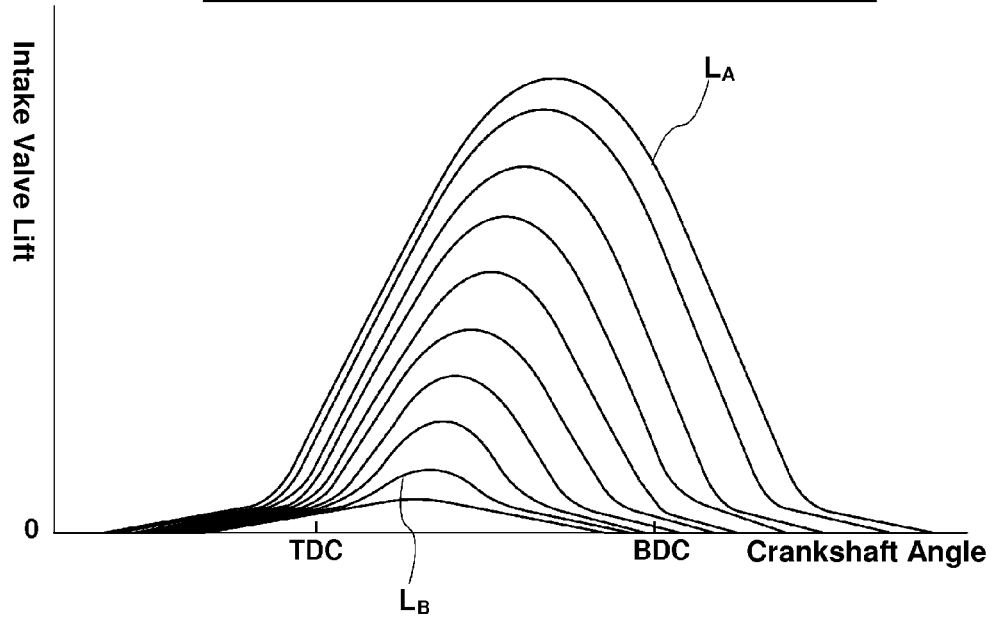
FIG. 8 shows various valve lift profiles generated by the variable valve lift mechanism in accordance with the embodiment.

As can be seen from FIG. 8, the variable valve lift (VVL) mechanism has characteristics where valve opening duration increases, peak valve lift timing is retarded and valve closing timing is retarded as the maximum valve lift increases. Further it can be seen that the valve opening timing does not change so much as the valve closing timing does.

This valve lift profile is preferable for regulating air charge inducted into the combustion chamber 27. When the throttle valve 49 is closed to regulate the air charge, it causes restriction of intake air flow to the combustion chamber 27, and the kinetic energy of the engine moving parts, such as the piston 25 and the crankshaft 21, are spent for pumping in the restricted air in an intake stroke of an engine cylinder cycle. This is called "pumping loss". Rather, the valve lift characteristic shown in FIG. 8 can regulate air charge with less throttling and less pumping loss.

Basically, the air charge will be decreased as the intake valve closing timing is advanced or retarded from certain timing. The certain timing is at the bottom dead center of the piston if the engine speed is extremely low because there is no inertia of the intake airflow. Practically, it retards as the inertia of the intake airflow increases. The inertia more heavily weights on the intake airflow rate or engine speed. Further, greater valve lift is required for greater airflow. Otherwise, flow restriction may occur at the intake port throat 28 and the intake valve 41 when the air flow increases in dependence on the increased airflow rate or air charge. The VVL mechanism described above has the characteristic where the valve closing timing is retarded as the valve lift is greater as shown in FIG. 8 and described above. Therefore, it can meet to the requirement for regulating air charge into the combustion chamber 27 with less throttling.

Figure 9:
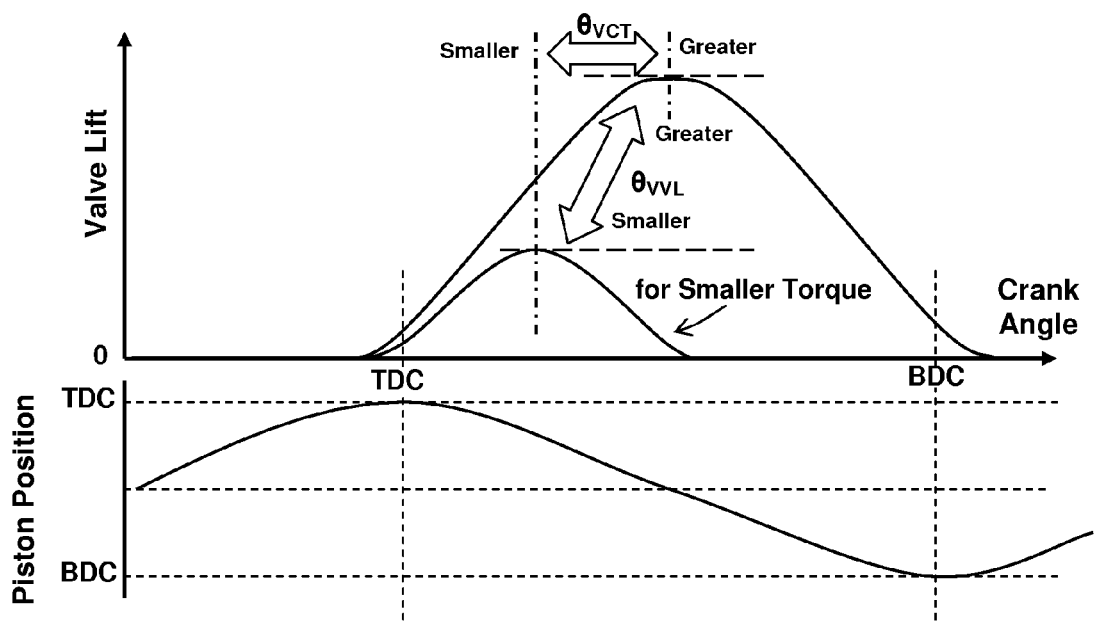
FIG. 9 shows a change of the valve lift profile in accordance with changes of control signals $\theta_{VCT}$ and $\theta_{VVL}$.

Referring to FIG. 9, there is shown a change of the valve lift profile of the intake valve 41 in accordance with the VCT control signal $\theta_{VCT}$ and the VVL control signal $\theta_{VVL}$ the engine controller 15 sends respectively to the VCT control system 210 and the VVL actuator 123. As the VCT control signal $\theta_{VCT}$ is greater, the crankshaft angle of the maximum valve lift is retarded. And as the VVL control signal $\theta_{VVL}$ is greater, the maximum valve lift is reduced and the valve closing timing is retarded.

The engine controller 15 is a microcomputer based controller having a central processing unit which runs programs using data, memories, such as RAM and ROM, storing the programs and data, and input/output (I/O) bus inputting and outputting electric signals, as is well known in the art. In the present embodiment, as shown in FIG. 1, the engine controller 15 is a separate unit from the HEV controller 14. But, the two controllers may be integrated into a single unit. As shown in FIG. 3, the engine controller 15 receives various inputs including an airflow AF from a mass airflow meter 61, an intake manifold pressure MAP from an intake air pressure sensor 62, a crank angle pulse signal from a crank angle sensor 63, based on which an engine speed $N_{ENG}$ is computed, a cylinder identification signal SIG from a SIG sensor 64 which detects one pulse signal per rotation of the inner shaft 105 of the valve driving mechanism 101, an oxygen concentration EGO in the exhaust gas from an exhaust gas oxygen sensor 65, and other sensors as is known in the art. In addition to the conventional inputs, the engine controller 15 receives an operational engine torque signal $TQ_{ENG\_O}$ from the HEV controller 14. On the other hand, the engine controller 15 outputs the computed engine speed $N_{ENG}$ to the HEV controller 14.

The crank angle sensor 63 has two sensor elements which are angularly spaced around the flywheel of the engine 2 and outputs two pulse signals with a fixed angular phase difference. The angular phase difference for the forward rotation of the crankshaft 21 is not same as that for the reverse rotation because of the angularly spaced arrangement of the two sensor elements. The reverse rotation of the crankshaft 21 may happen just before the angular movement of the crankshaft 21 completely stops. Based on the two pulse signals from the crank angle sensor 63, the engine controller 15 identifies of the rotational direction of the crankshaft 21 and considers it when counting the pulses. Therefore, by considering the rotational direction of the crankshaft 21 as well as the pulse signal from the crank angle sensor 63 and the SIG signal from the SIG sensor 64, the engine controller 15 can recognize the absolute angular position of the crankshaft 21 with regard to an engine cycle which consists of 720° CA (degree crank angle) until its angular movement completely stops. Then, the recognized absolute angular position of the crankshaft 21 is stored in the memory of the engine controller 15 for the future engine restarting.

The engine controller 15 computes operating parameters for the actuators, for example, including the throttle actuator 49a, the fuel injectors 45, the ignition system 44, and the valve drive mechanism 101, in accordance with the inputs described above. Then, the controller 15 outputs control signals, for example, including the desired throttle position signal TVO, the fuel injection pulse FP, and the VCT and VVL control signals $\theta_{VCT}$ and $\theta_{VVL}$.

Control in HEV Controller

The HEV controller 14 controls the overall HEV power-train 1. It directly controls the first and second inverters 12 and 13, and indirectly controls the engine 2 through the engine controller 15. Control routines RH1 through RH5 which the HEV power-train controller 14 executes will now be described with reference to FIGS. 10 through 14. First, there is shown, in FIG. 10, a mode selection routine RH1.

After a start, the routine RH1 proceeds to a step S101, and the HEV controller 14 reads data in its memory including the accelerator pedal position a from the accelerator position sensor 32, the engine speed $N_{ENG}$ derived from the engine controller 15, the battery voltage $V_B$ from the battery voltage sensor 34, and signals indicating auxiliary loads such as a desired operation of a compressor for a vehicle air conditioner. Then, the routine RH1 proceeds to a step S102, and the HEV controller 14 determines desired power $P_{HEV\_D}$ at the driving wheels 9. The determination of $P_{HEV\_D}$ is based on the vehicle speed VSP detected by the vehicle speed sensor 31 and the accelerator position a and generally in proportion to a product of those two parameters at least in a part of the range.

After the step S102, the routine RH1 proceeds to a step S103 and determines desired auxiliary power $P_{AUX\_D}$, which is desired to charge the battery 11 or drive the other auxiliary load such as air conditioner compressor. Therefore, the determination of $P_{AUX\_D}$ is based on the battery voltage $V_B$ and the other data relating to the auxiliary load read at the step S101. After the step S103, the routine RH1 proceeds to a step S104, and the HEV controller 14 determines desired engine power $P_{ENG\_D}$, which is generally the sum of $P_{HEV\_D}$ and $P_{AUX\_D}$ because the engine 2 is the single source of power within the HEV power-train 1. The determination of $P_{ENG\_D}$ may take into account the vehicle speed VSP in addition to those two parameters because the efficiency of the power transmission mechanism 5 varies depending on its speed.

After the step S104, the routine RH1 proceeds to a step S105 and determines whether an engine running flag $F_{ENG\_RUN}$ is high (=1) or not. If it is determined at the step S105 the engine running flag $F_{ENG\_RUN}$ is high, which means that the engine is currently in operation and the HEV power-train 1 is in an engine running mode, the routine proceeds to a step S106 and determines whether the desired engine power $P_{ENG\_D}$ determined at the step S104 is greater than a first reference engine power $P_{ENG\_1}$ or not. If it is determined at the step S106 that the desired engine power $P_{ENG\_D}$ is greater than the first reference engine power $P_{ENG\_1}$, which means the engine 2 is still required to run in the engine running mode, the routine RH1 returns.

On the other hand, if it is determined at the step S106 that the desired engine power $P_{ENG\_D}$ is not greater than the first reference engine power $P_{ENG\_1}$, which means the engine 2 is not required to run any more and the HEV power-train 1 is to be in an engine stopping mode, the routine RH1 proceeds to a step S107 and resets the engine running flag $F_{ENG\_RUN}$ to be low (=0). Then, the routine further proceeds to a step S108 and sets a first engine stopping flag $F_{ENG\_STOP\_1}$ is high (=1), and it returns.

Figure 10:
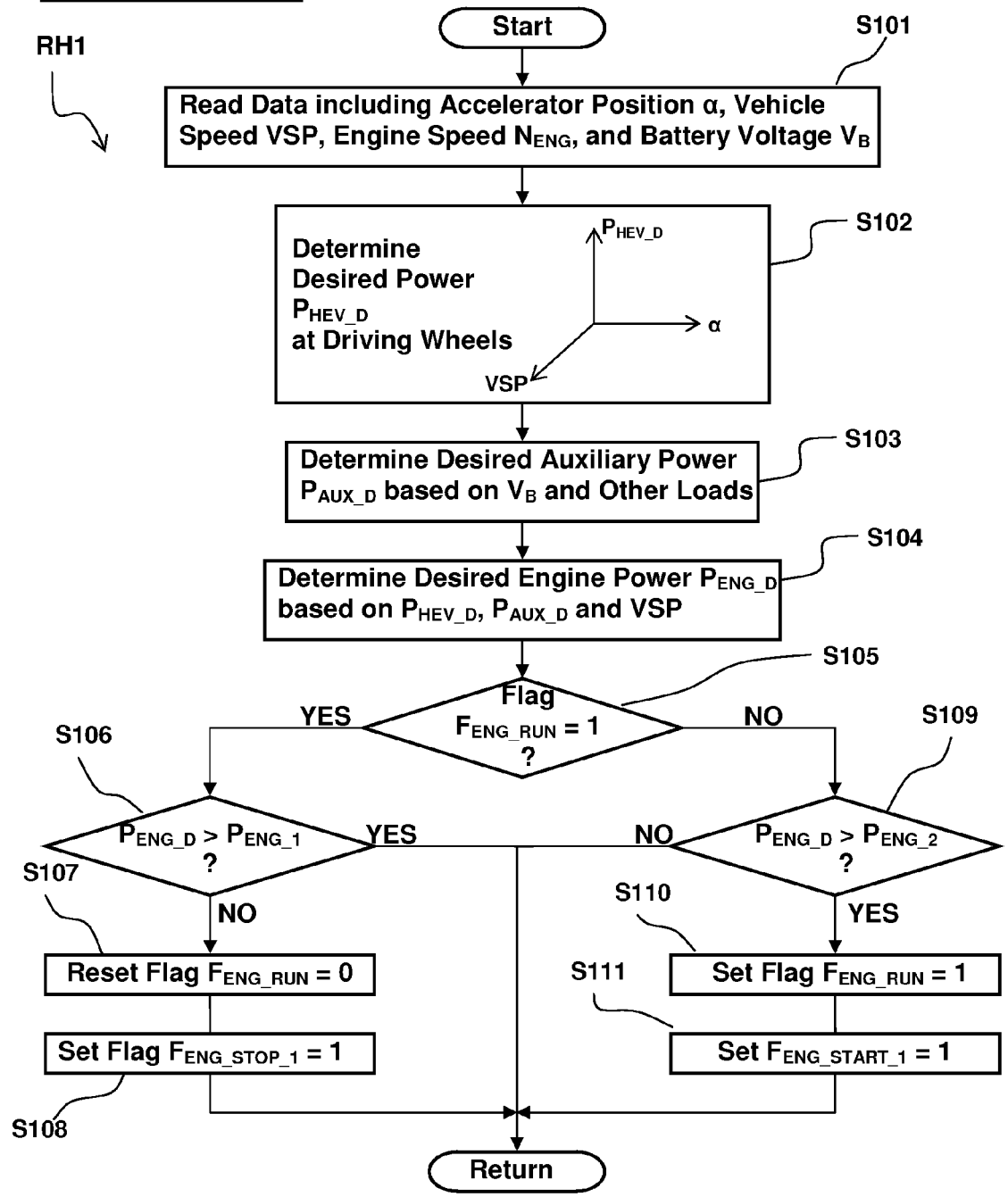
FIG. 10 shows a flowchart of a routine RH1 for operational mode selection of the HEV power-train which a HEV controller executes.

When, at the step S105 of the routine RH1 in FIG. 10, it is determined that the engine running flag $F_{ENG\_RUN}$ is low (=0), which means that the engine is currently not in operation and the HEV power-train 1 is in an electric mode, the routine RH1 proceeds to a step S109 and determines whether the desired engine power $P_{ENG\_D}$ determined at the step S104 is greater than a second reference engine power $P_{ENG\_2}$ that is greater than the first reference engine power $P_{ENG\_1}$. If it is determined at the step S109 that the desired engine power $P_{ENG\_D}$ is not greater the second reference engine power $P_{ENG\_2}$, it means that the engine 2 is still not required to run and the HEV power-train 1 is to stay in the electric mode, and the routine RH1 returns. On the other hand, if it is determined at the step S109 that the desired engine power $P_{ENG\_D}$ is greater the second reference engine power $P_{ENG\_2}$, which means that the engine 2 is now required to start running and the HEV power-train 1 is in an engine starting mode, then the routine RH1 proceeds and sets the engine running flag $F_{ENG\_RUN}$ to be high (=1) at a step S110 and a first engine starting flag $F_{ENG\_START\_1}$ to be high (=1) and returns.

Figure 11:
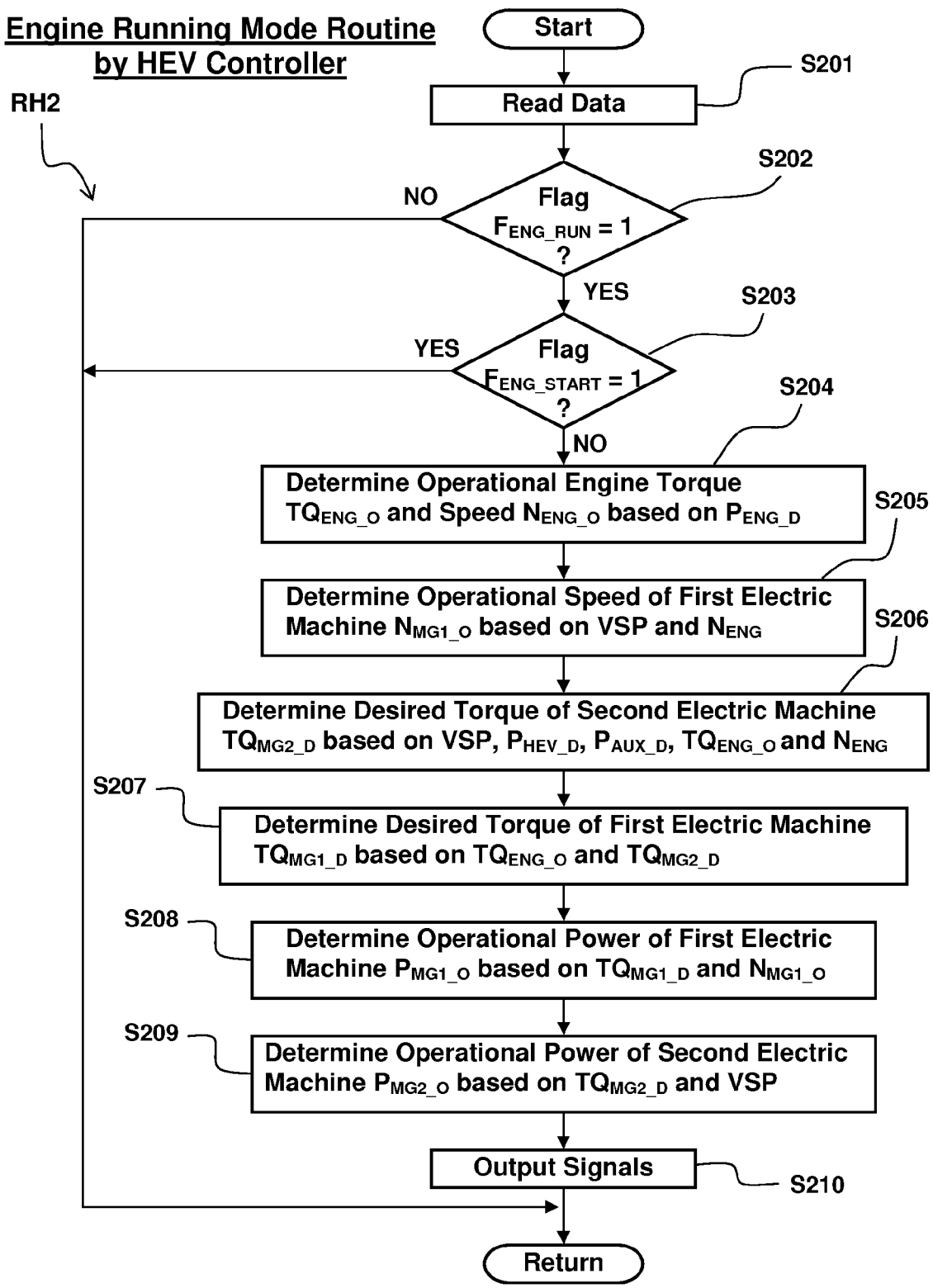
FIG. 11 shows a flowchart of a routine RH2 for an engine running mode of the HEV power-train which the HEV controller executes.

Referring to FIG. 11, there is shown a routine RH2 for the engine running mode which the HEV controller 14 executes. After the start, the routine proceeds to a step S201 and reads data in its memory such as the flags set and reset in the routine RH1 described above in addition to those from the sensors as read at the step S101 of the routine RH1. Then, the routine RH2 proceeds to a step S202 and determines whether the engine running flag $F_{ENG\_RUN}$ is high (=1) or not. If it is determined at the step S202 that the engine running flag $F_{ENG\_RUN}$ is low (=0), it means that the engine 2 is not required to run and the HEV power-train 1 is not in the engine running mode, and the routine RH2 returns. Otherwise, it proceeds to a step S203 and determines whether the first engine starting flag $F_{ENG\_START\_1}$ is high (=1) or not.

If it is determined at the step S203 that the first engine starting flag $F_{ENG\_START\_1}$ is high (=1), it means that the engine 2 is in the middle of the engine starting mode which will be described later with reference to FIGS. 14 and 16 and the HEV power-train is transitioning from the electric mode to the engine running mode, and the routine RH2 returns. Otherwise, it proceeds to a step S204 and determines operational engine torque $TQ_{ENG\_O}$ and an operational engine speed $N_{ENG\_O}$ based on the desired engine power $P_{ENG\_D}$ determined at the step S104 with reference to a table which contains combinations of torque and speed with the best efficiencies for the respective desired engine powers $P_{ENG\_D}$. Then, the routine proceeds to a step S205 and determines an operational speed $N_{MG1\_O}$ of the first electric machine 3 based on the vehicle speed VSP and the engine speed $N_{ENG}$ in consideration of the collinear diagram as shown in FIG. 2. After the step S205, the routine proceeds to a step S206 and determines desired torque $TQ_{MG2\_D}$ of the second electric machine 4 primarily based on the vehicle speed VSP, the desired power $P_{HEV\_D}$ at the wheels 9, the desired auxiliary power $P_{AUX\_D}$, the operational engine torque $TQ_{ENG\_O}$ and the current engine speed $N_{ENG}$. Then, the routine RH2 proceeds to a step S207 and determines desired torque $TQ_{MG1\_D}$ of the first electric machine 3 primarily based on the operational engine torque $TQ_{ENG\_O}$ and the desired torque $TQ_{MG2\_D}$ of the second electric machine 4 in consideration of the collinear diagram as shown in FIG. 2.

Following the determination of the torque and speeds of the engine 2 and the first and electric machines 3 and 4 at the steps S204 through S207, the routine RH2 determines operational power $P_{MG1\_O}$ and $P_{MG2\_O}$ of the first and second electric machines 3 and 4 respectively at steps S208 and S209. Then, the routine proceeds to a step S210, and the HEV controller 14 outputs signals to the engine controller 15 and the first and second inverters 12 and 13. For example, the HEV controller sends a signal corresponding to the operational engine torque $TQ_{ENG\_O}$ determined at the step S204 to the engine controller 15, which then controls actuators including the fuel system 46, the throttle actuator 49a, the VCT control system 210 and the VVL actuator 123 so that the engine 2 generates the operational engine torque $TQ_{ENG\_O}$. The fuel injection pulse FP output from the engine controller 15 to the fuel system 46 is generally in proportion with the operational engine torque, and the throttle control signal TVO, the VCT control signal $\theta_{VCT}$ and the VVL control signal $\theta_{VVL}$ are determined from two dimensional maps of the engine speed $N_{ENG}$ and the operational engine torque $TQ_{ENG\_O}$ so that proper amount of air is inducted into the engine 1 and an air-fuel ratio in the combustion chamber 27 is a desired value such as the stoichiometric air fuel ratio.

Also at the step S210, the HEV controller 14 sends signals corresponding to the operational power $P_{MG1\_O}$ and $P_{MG2\_O}$ of the first and second electric machines 3 and 4 determined at the steps S208 and S209 to the first and second inverters 12 and 13 respectively to operate the first and second electric machines 3 and 4 accordingly. After the step S210, the routine RH2 returns.

Figure 12:
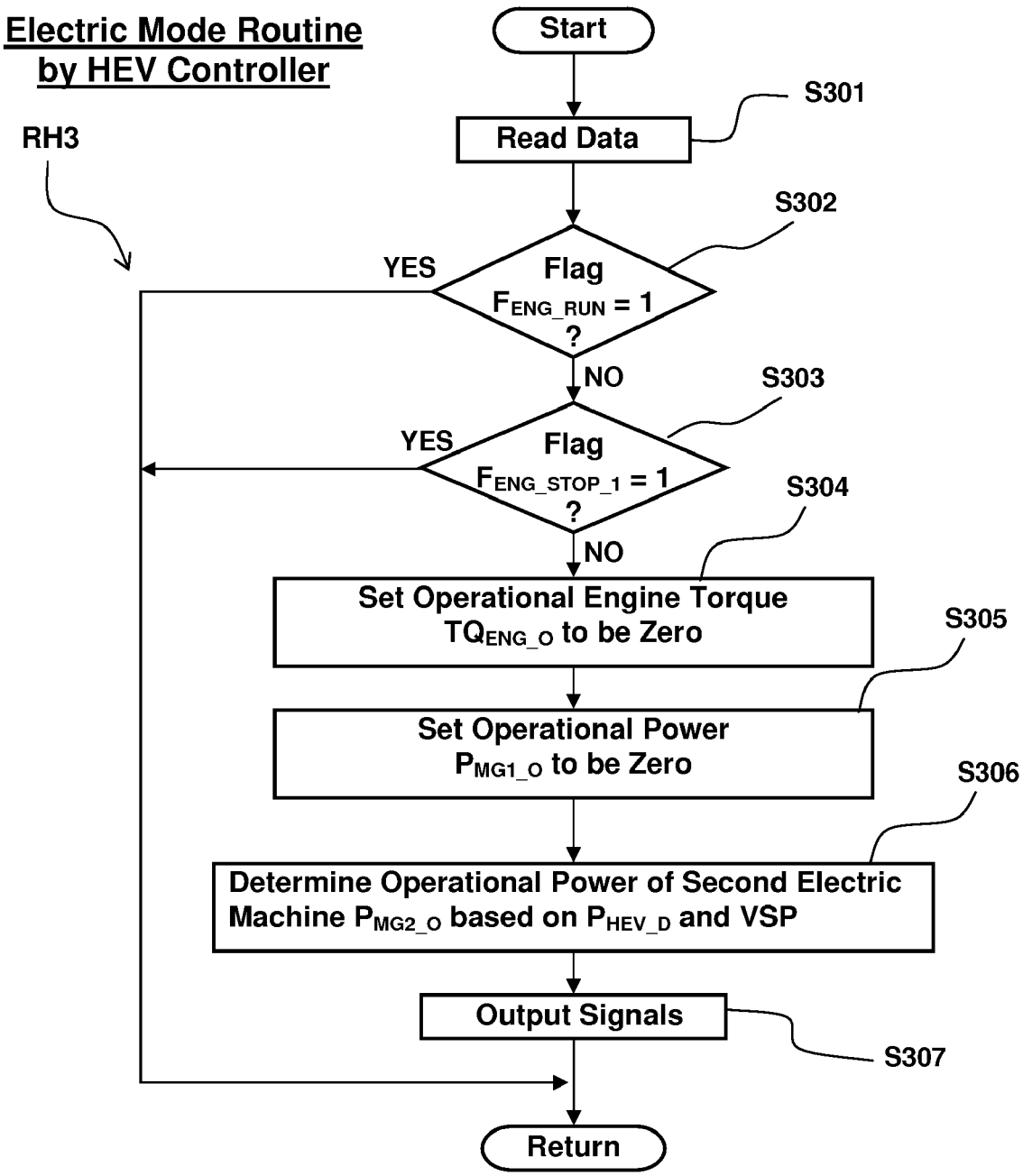
FIG. 12 shows a flowchart of a routine RH3 for an electric mode of the HEV power-train which the HEV controller executes.

Referring to FIG. 12, there is shown a routine RH3 for the electric mode which the HEV controller 14 executes. After the start, the routine proceeds to a step S301 and reads data in its memory such as the flags set and reset at the steps S107, S108, S110 and S111 of the routine RH1 described above in addition to those from the sensors as read at the step S101. Then, the routine RH3 proceeds to a step S302 and determines whether the engine running flag $F_{ENG\_RUN}$ is high (=1) or not. If it is determined at the step S302 that the engine running flag $F_{ENG\_RUN}$ is high (=1), it means that the engine 2 is required to run and the HEV power-train 1 is not in the electric mode, and the routine RH3 returns. Otherwise, it proceeds to a step S303 and determines whether the engine stop flag $F_{ENG\_STOP\_1}$ is high (=1) or not.

If it is determined at the step S303 that the first engine starting flag $F_{ENG\_STOP\_1}$ is high (=1), it means that the engine 2 is in the middle of the engine stopping mode which will be described later with reference to FIGS. 13 and 15 and the HEV power-train is transitioning from the electric mode to the engine running mode, and the routine RH3 returns. Otherwise, the routine RH3 proceeds to a step S304 and sets the operational engine torque $TQ_{ENG\_O}$ to be zero since the engine 2 is not required to run in the electric mode. Also, the routine RH3 sets the operational power $P_{MG1\_O}$ of the first electric machine 3 to be zero at a step S305 because it is required to generate neither of positive nor negative torque in the electric mode as described with reference to FIG. 2(B).

After the step S305, the routine RH3 proceeds to a step S306 and determines the operational power $P_{MG2\_O}$ of the second electric machine 4 based on the desired power $P_{HEV\_D}$ at the driving wheels 9 and the vehicle speed VSP. Then, the routine RH3 proceeds to a step S307 and outputs the signals to the engine controller 15 and the first and second inverters 12 and 13 as is done at the step S210 of the routine RH2.

Figure 13:
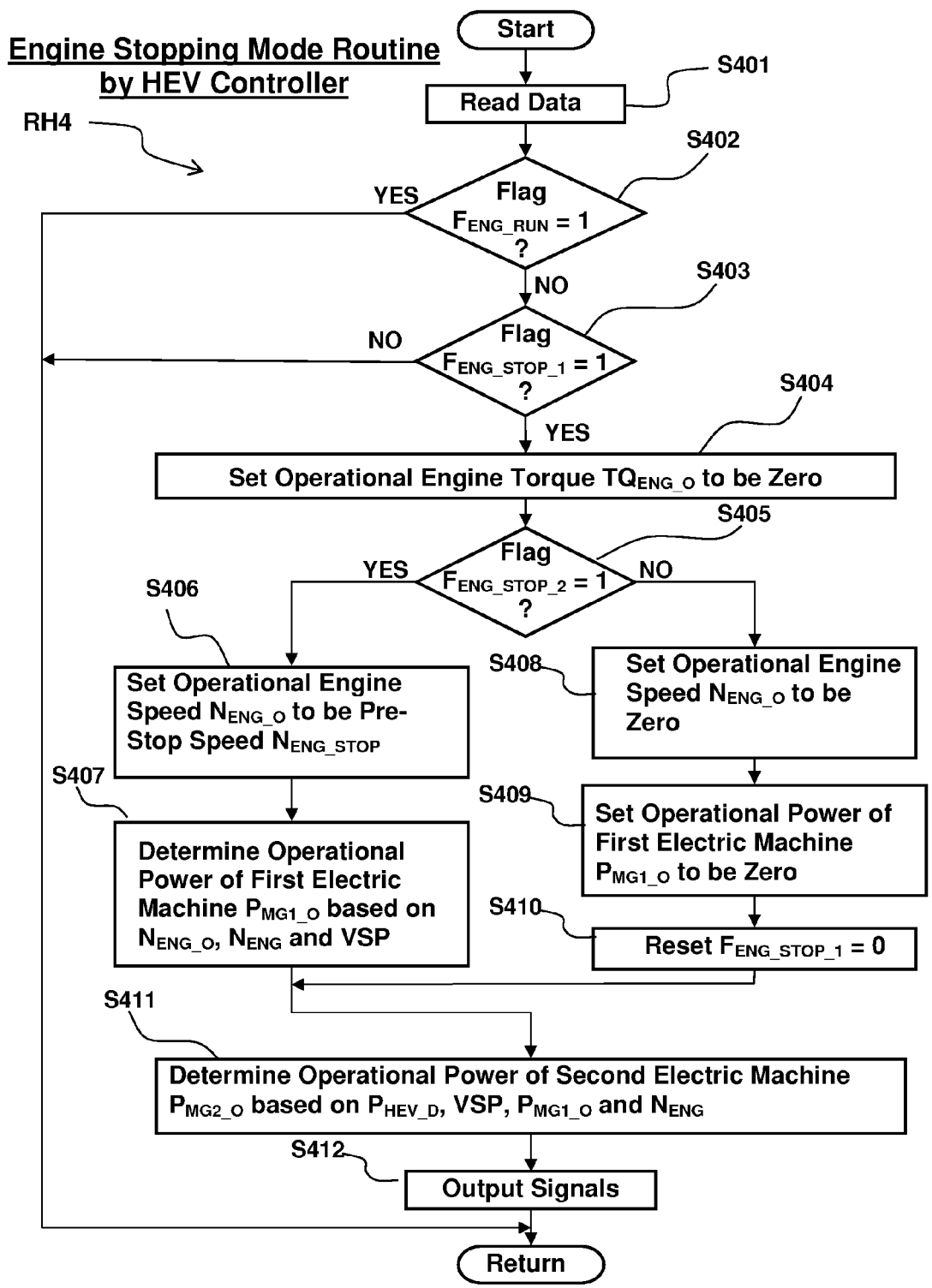
FIG. 13 shows a flowchart of a routine RH4 for an engine stopping mode of the HEV power-train which the HEV controller executes.

Referring to FIG. 13, there is shown a routine RH4 for the engine stopping mode which the HEV controller 14 executes. After the start, the routine proceeds to a step S401 and reads data in its memory such as the flags set and reset at the steps S107, S108, S110 and S111 of the routine RH1 described above in addition to those from the sensors as read at the step S101 of the routine RH1. Then, the routine RH4 proceeds to a step S402 and determines whether the engine running flag $F_{ENG\_RUN}$ is high (=1) or not. If it is determined at the step S402 that the engine running flag $F_{ENG\_RUN}$ is high (=1), it means that the engine 2 is required to run and the HEV power-train 1 is not in the engine stopping mode, and the routine RH4 returns. Otherwise, it proceeds to a step S403 and determines whether the first engine stopping flag $F_{ENG\_STOP\_1}$ is high (=1) or not.

If it is determined at the step S403 that the first engine stopping flag $F_{ENG\_STOP\_1}$ is low (=0), it means that the HEV power-train is in the electric mode, and the routine RH4 returns. Otherwise, it proceeds to a step S404 and sets the operational engine torque $TQ_{ENG\_O}$ to be zero since the engine 2 is not required to run any more.

After the step S404, the routine RH4 proceeds to a step S405 and determines whether or not a second engine stopping flag $F_{ENG\_STOP\_2}$ is high (=1) or not. The flag $F_{ENG\_STOP\_2}$ is set by a routine RE6 executed by the engine controller 15 until it determines that the engine 2 has rotated enough to reduce air charged therein. If it is determined at the step S405 that the second engine stopping flag $F_{ENG\_STOP\_2}$ is high (=1), the routine RH4 proceeds to a step S406 and sets the operational engine speed $N_{ENG\_O}$ to be a pre-stop speed $N_{ENG\_STOP}$ which is predetermined to be 1000 rpm for example. Then, the routine proceeds to a step S407 and determines the operational power $P_{MG1\_O}$ of the first electric machine 3 primarily based on the operational engine speed $N_{ENG\_O}$, the current engine speed $N_{ENG}$ and the vehicle speed VSP so that the engine speed $N_{ENG}$ to be feedback controlled to the pre-stop engine speed $N_{ENG\_STOP}$.

On the other hand, if it is determined at the step S405 that the second engine stopping flag $F_{ENG\_STOP\_2}$ is low (=0), it means that the engine controller 15 has determined the engine 2 has rotated enough to reduce air charged therein, and the routine RH4 sets the operational engine speed $N_{ENG\_O}$ to be zero at a step 408 and then sets the operational power $P_{MG1\_O}$ of the first electric machine 3 to be zero at a step S409. Next, the routine proceeds to a step S410 and reset the first engine stopping flag $F_{ENG\_STOP\_1}$ (=0).

Following the step S407 or S410, the routine RH4 proceeds to a step S411 and determines the operational power $P_{MG2\_O}$ of the second electric machine 4 primarily based on the desired power $P_{HEV\_D}$ at the driving wheels 9 and the vehicle speed VSP and additionally on the operational power $P_{MG1\_O}$ of the first electric machine 3 and the current engine speed $N_{ENG}$. In the determination of $P_{MG2\_O}$, the operational power of the second electric machine 4 is determined greater as $P_{MG1\_O}$ of the first electric machine 3 is greater in consideration of the torque balance shown in FIG. 2. Then, the routine RH4 proceeds to a step S412 and outputs the signals to the engine controller 15 and the first and second inverters 12 and 13, and it returns.

Figure 14:
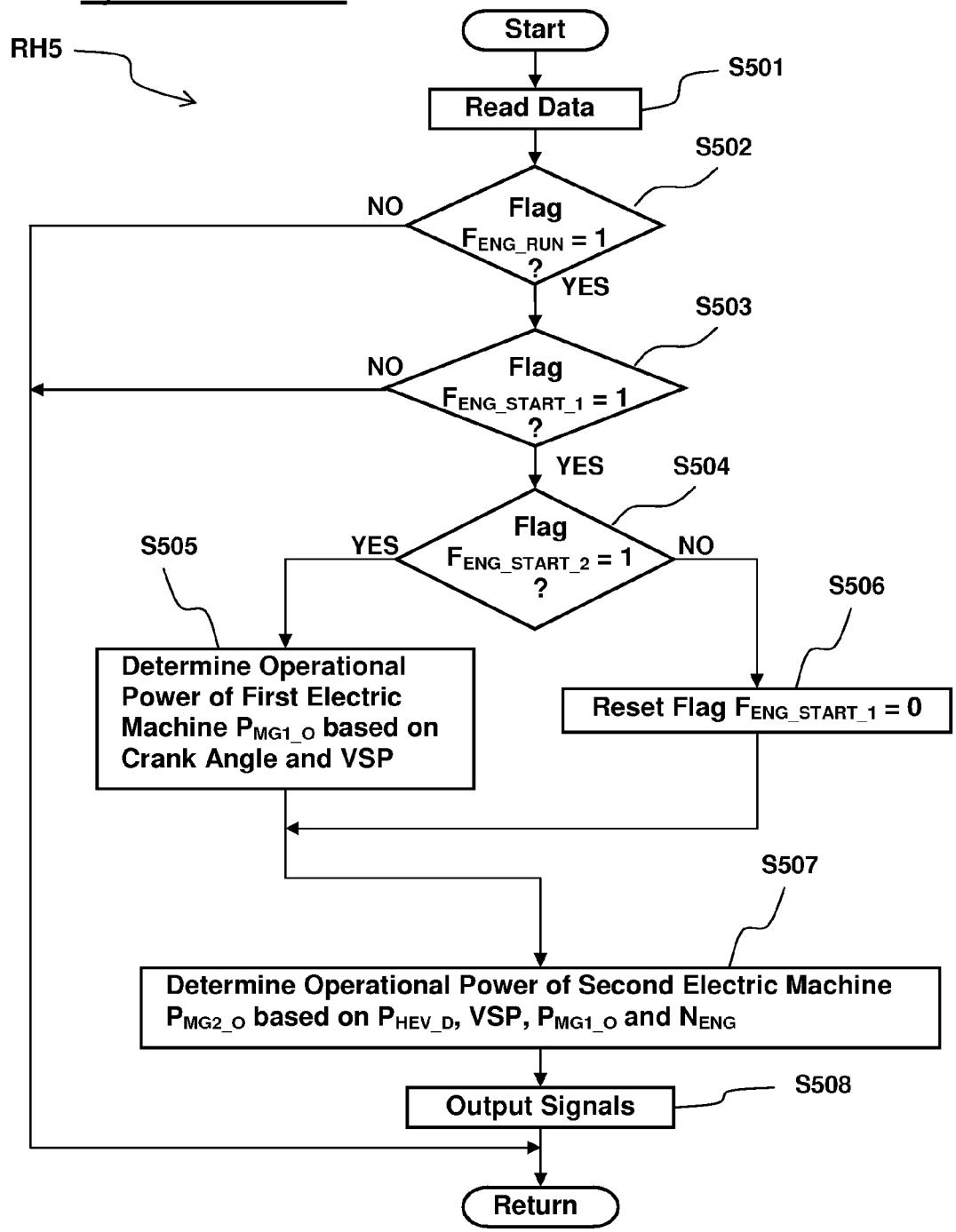
FIG. 14 shows a flowchart of a routine RH5 for an engine starting mode of the HEV power-train which the HEV controller executes.

Referring to FIG. 14, there is shown a routine RH5 for the engine starting mode which the HEV controller 14 executes. After the start, the routine proceeds to a step S501 and reads data in its memory such as the flags set and reset at the steps S107, S108, S110 and S111 of the routine RH1 described above in addition to those from the sensors as read at the step S101 of the routine RH1. Then, the routine RH5 proceeds to a step S502 and determines whether the engine running flag $F_{ENG\_RUN}$ is high (=1) or not. If it is determined at the step S502 that the engine running flag $F_{ENG\_RUN}$ is low (=0), it means that the engine 2 is not required to run and the HEV power-train 1 is not in the engine start mode, and the routine RH5 returns. Otherwise, it proceeds to a step S503 and determines whether the first engine starting flag $F_{ENG\_START\_1}$ is high (=1) or not.

If it is determined at the step S503 that the first engine starting flag $F_{ENG\_STOP\_1}$ is low (=0), it means that the HEV power-train is in the engine running mode, and the routine RH4 returns. Otherwise, it proceeds to a step S504 and determines whether a second engine starting flag $F_{ENG\_START\_2}$ is high (=1) or not. The flag $F_{ENG\_START\_2}$ is set by a routine RE7 executed by the engine controller 15 until it considers the engine 2 has exceeded a predetermined speed $N_{ENG\_START}$.

If it is determined at the step S504 that the second engine starting flag $F_{ENG\_START\_2}$ is high (=1), the routine RH5 proceeds to a step S505 and determines the operational power $P_{MG1\_O}$ of the first electric machine 3 based on the vehicle speed VSP and an angular position of the crankshaft 21 of the engine 2 which is computed in the engine controller 15 based on the crank angle position from the crank angle sensor 63 and the SIG signal from the SIG sensor 64.

On the other hand, if the second engine starting flag $F_{ENG\_START\_2}$ is low (=0), which means the engine 2 has competes the starting phase, the routine proceeds to a step S506 and resets the first engine starting flag $F_{ENG\_START\_1}$ to be low (=0) so that the HEV power-train will be in the engine running mode beginning in the next path of each of the routines RH1 through RH6.

After the step S505 or S506, the routine RH5 proceeds to a step S507 and determines the operational power $P_{MG2\_O}$ of the second electric machine 4 primarily based on the desired power $P_{HEV\_D}$ at the driving wheels 9 and the vehicle speed VSP and additionally on the operational power $P_{MG1\_O}$ of the first electric machine 3 and the current engine speed $N_{ENG}$. In the determination of $P_{MG2\_O}$ of the operational power of the second electric machine 4 is determined greater as $P_{MG1\_O}$ of the first electric machine 3 is greater in consideration of the torque balance shown in FIG. 2. Then, the routine RH4 proceeds to a step 508 and outputs the signals to the engine controller 15 and the first and second inverters 12 and 13, and it returns.

Control in Engine Controller

The engine controller 15 controls the actuators of the engine 2, such as the ignition system 44, the fuel system 46 including the fuel injector 45, the throttle actuator 49, the VCT control system 210 and the VVL actuator 123. In the engine running mode which is taken when it is determined in the mode selection routine RH1 of FIG. 10 that the engine running flag $F_{ENG\_RUN}$ is high but neither of the first engine stop flag $F_{ENG\_STOP}$ and the first engine starting flag $F_{ENG\_START}$ is high, the engine controller 15 computes, under a normal engine control strategy, control signals for those actuators mainly based on the operational engine torque $TQ_{ENG\_O}$ which is computed at the step S204 of the routine RH2 and the current engine speed $N_{ENG}$ which is computed based on the crank angle pulse signal detected by the crank angle sensor 63. The fuel injection pulse FP output from the engine controller 15 to the fuel system 46 is generally in proportion with the operational engine torque $TQ_{ENG\_O}$, and the throttle control signal TVO, the VCT control signal $\theta_{VCT}$ and the VVL control signal $\theta_{VVL}$ are determined from two dimensional maps of the engine speed $N_{ENG}$ and the operational engine torque $TQ_{ENG\_O}$ so that proper amount of air is inducted into the engine 1 and an air-fuel ratio in the combustion chamber 27 is a desired value such as the stoichiometric air fuel ratio.

In the electric mode which is taken when it is determined in the mode selection routine RH1 of FIG. 10 that the engine running flag $F_{ENG\_RUN}$ is low and neither of the first engine stop flag $F_{ENG\_STOP}$ and the first engine starting flag $F_{ENG\_START}$ is high, the operational engine torque is set to be zero. Then, the engine controller 15 determines the fuel injection pulse FP to be zero, and no fuel is injected from the fuel injector 45. But, the VCT control signal $\theta_{VCT}$ and the VVL control signal $\theta_{VVL}$ are held, and the valve lift profile set in the engine stopping mode is maintained.

Figure 15:
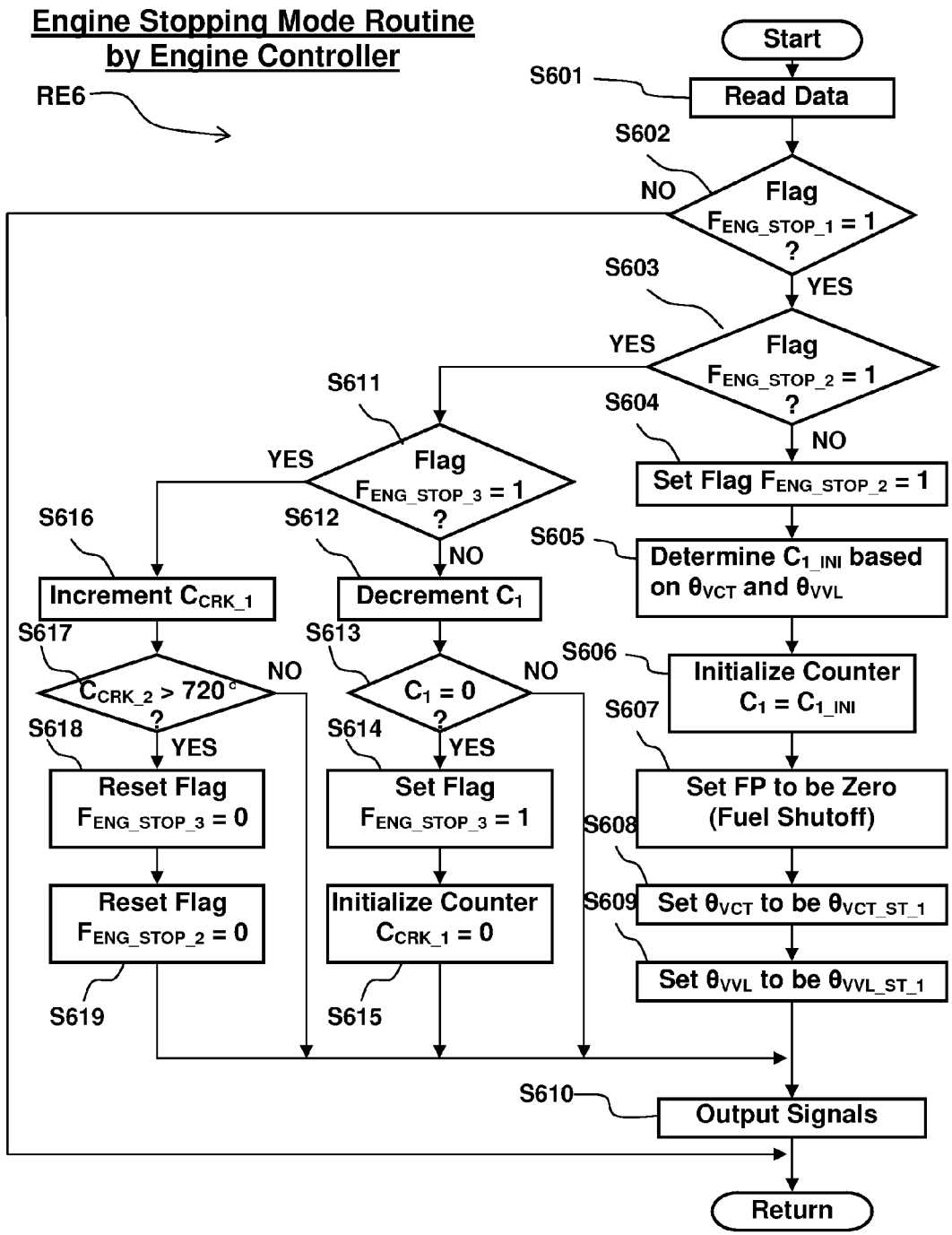
FIG. 15 shows a flowchart of a routine RE6 which an engine controller executes during the engine stopping mode of the HEV power-train.

Referring to FIG. 15, there is shown a engine stopping mode routine RE6 which the engine controller 15 executes during the engine stopping mode in which the HEV controller 14 executes the routine RH4 shown in FIG. 13. After the start, the routine RE6 proceeds to a step S601, and the engine controller 15 reads data in its memory such as the flags set and reset in the routine RH1 described above with reference to FIG. 9, executed by and input from the HEV controller 14 in addition to the signals from the various sensors.

Then, the routine RE6 proceeds to a step S602 and determines whether the first engine stopping flag $F_{ENG\_STOP\_1}$, which the HEV controller 14 may set in the mode selection routine RH1, is high (=1) or not. If it is determined at the step S602 that the first engine stop flag $F_{ENG\_STOP\_1}$ is low (=0), it means that the engine 2 is not in the engine stopping mode, and the routine RE6 returns. Otherwise, the routine proceeds to a step S603 and determines whether the second engine stop flag $F_{ENG\_STOP\_2}$ is high (=1) or not. In the first path of the engine stopping mode, the flag $F_{ENG\_STOP\_2}$ is low (=0).

When the first path of the engine stopping mode takes place, the routine RE6 proceeds to a step S604 and sets the second engine stop flag $F_{ENG\_STOP\_2}$ to be high (=1), which causes the routine RH4 to determine the operational engine speed $N_{ENG\_O}$ to be the pre-stop engine speed $N_{ENG\_STOP}$ at its step S406 instead of zero at the step S408. Then, the routine RE6 proceeds to a step S605 and determines an initial counter value $C_{1\_INI}$ of a first counter $C_1$ based on the current VCT control signal $\theta_{VCT}$ for the VCT control system 210 and the current VVL control signal $\theta_{VVL}$ for the VVL actuator 123. The value $C_{1\_INI}$ is determined in consideration of responses of the VCT control system 210 and the VVL actuator 123 so that the value $C_{1\_INI}$ is greater as the signals $\theta_{VCT}$ and $\theta_{VVL}$ indicate that the closing timing of the intake valve 41 is more retarded and the intake valve lift is greater. Then, the routine RE6 proceeds to a step S606 and initialize the first counter $C_1$ with the initial value $C_{1\_INI}$ determined at the step S605.

After the step S606, the routine RE6 proceeds to a step S607 and sets the fuel injection pulse FP to be zero to shut off fuel injected from the fuel injector 45. Then, the routine proceeds to steps S608 and S609 and sets the VCT and VVL control signals $\theta_{VCT}$ and $\theta_{VVL}$ to be predetermined values $\theta_{VCT\_ST\_1}$ and $\theta_{VVL\_ST\_1}$ for engine stopping and starting. The values $\theta_{VCT\_ST\_1}$ and $\theta_{VVL\_ST\_1}$ are predetermined so that the closing timing of the intake valve 41 is greatly advanced from a bottom dead center of an intake stroke, for example by 100° CA (crank angle) and a maximum valve lift is greatly reduced, for example, to be 20% of the greatest valve lift.

After the step S609, the routine RE6 proceeds to a step S610, and the engine controller 15 outputs the control signals which are set during the process of the routine RE6 to the actuators and the HEV controller 14. For example, the fuel injection pulse FP set at the step S607 is output to the fuel system 46, the VCT control signal $\theta_{VCT}$ is output to the VCT control system 210, and the VVL control signal $\theta_{VVL}$ is output to the VVL actuator 123.

When it is determined at the step S603 that the second engine stop flag $F_{ENG\_STOP\_2}$ is high (=1), it means that the engine 2 is already in the engine stopping mode, and the routine RE6 proceeds to a step S611 and determines whether a third engine stop flag $F_{ENG\_STOP\_3}$ is high (=1) or not. If it is high, the routine proceeds to a step S612 and decrements the counter $C_1$ for example by one. Then, the routine proceeds to a step S613 and determines whether the counter $C_1$ reaches zero or not. If no, the routine proceeds to the step S610, and the engine controller 15 outputs the control signals to the actuators.

If it is determined at the step S613 that the counter $C_1$ counts down and reaches zero, it means that the actual positions of the VCT actuator 103 and the VVL actuator 123 are supposed to correspond to the values $\theta_{VCT\_ST\_1}$ and $\theta_{VVL\_ST\_1}$ set at the steps S608 and S609. In other words, the valve lift profile for the engine stopping is supposedly obtained because the response of the actuators are taken account of based on the valve lift profile at the first path of the routine RE6.

Then, the routine RE6 proceeds to the step S614 and sets the third engine stop flag $F_{ENG\_STOP\_3}$ to be high (=1). Then, it proceeds to a step S615 and initializes a first crank angle counter $C_{CRK\_1}$ to be zero. The first crank angle counter $C_{CRK\_1}$ counts up by the angle of rotation of the crankshaft 21 detected by the crank angle sensor 63 during one path of this routine. After the step S606, the routine proceeds to the step S610 described above.

When it is determined at the step S611 that the third engine stop flag $F_{ENG\_STOP\_3}$ is high (=1), it means that the first counter $C_1$ has counted the initial value $C_{1\_INI}$ determined at the step S605. Then, the routine RE6 proceeds to a step S616 and increments the first crank angle counter $C_{CRK\_1}$ by an angle of rotation of the crankshaft 21 during the last path of the routine. After the step S616, the routine RE6 proceeds to a step S617 and determines whether the first crank angle counter $C_{CRK\_1}$ exceeds a predetermined value, for example 720° CA, in other words, two rotations of the crankshaft 21 or one engine cycle.

If it is determined at the step S617 that the first crank angle counter $C_{CRK\_1}$ does not exceed the predetermined value, the routine RE6 proceeds to the step S610 described above. On the other hand, if it is determined the first crank angle counter $C_{CRK\_1}$ exceeds the predetermined value, it means that the engine 2 has rotated by the predetermined amount since it is determined at the step S613 that the actual positions of the VCT actuator 103 and the VVL actuator 123 are supposed to correspond to the values $\theta_{VCT\_ST\_1}$ and $\theta_{VVL\_ST\_1}$. Then, the routine proceeds to a step S618 and resets the third engine stop flag $F_{ENG\_STOP\_3}$ to be low (=0). Further, it resets at a step S619 the second engine stop flag $F_{ENG\_STOP\_2}$ to be low (=0), which causes the routine RH4 to sets the operational engine speed $N_{ENG\_O}$ to be zero at the step S408 of the routine RH4 the HEV controller 14 executes.

Figure 16:
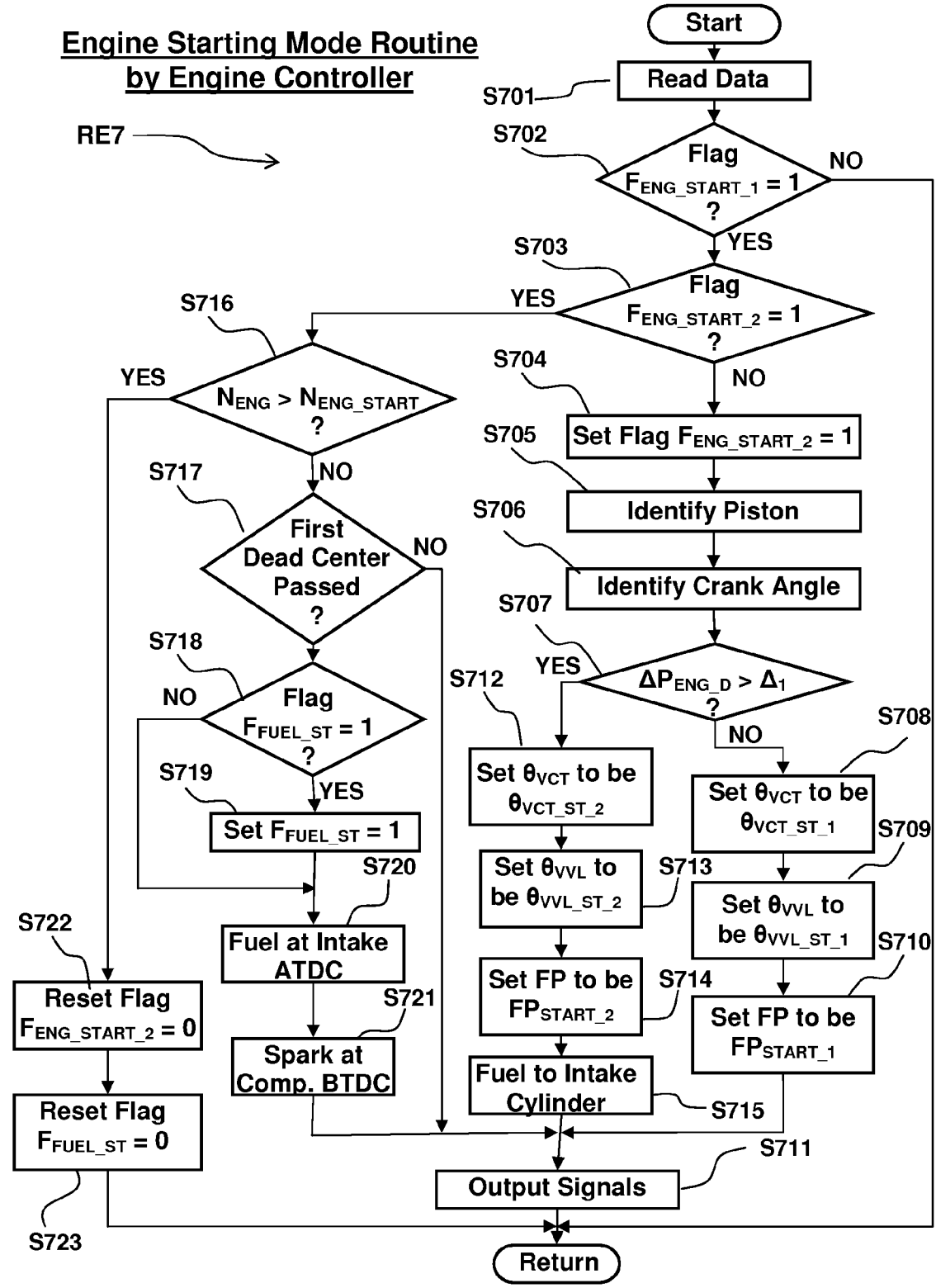
FIG. 16 shows a flowchart of a routine RE7 which the engine controller executes during the engine starting mode of the HEV power-train.

Referring to FIG. 16, there is shown an engine stop routine RE7 which the engine controller 15 executes during the engine starting mode in which the HEV controller 14 executes the routine RH5 shown in FIG. 14. After the start, the routine RE7 proceeds to a step S701, and the engine controller 15 reads data in its memory such as the flags set and reset in the routine RH1 described above with reference to FIG. 9, executed by and input from the HEV controller 14 in addition to the signals from the various sensors.

Then, the routine RE7 proceeds to a step S702 and determines whether the first engine starting flag $F_{ENG\_SART\_1}$ is high (=1) or not. If it is determined at the step S702 that the first engine starting flag $F_{ENG\_START\_1}$ is low (=0), it means that the engine 2 is not in the engine starting mode, and the routine RE7 returns. Otherwise, the routine proceeds to a step S703 and determines whether the second engine stop flag $F_{ENG\_START\_2}$ is high (=1) or not. In the first path of the engine starting mode, the flag $F_{ENG\_START\_2}$ is low (=0).

When the first path of the engine starting mode takes place, the routine RE7 proceeds to a step S704 and sets the second engine starting flag $F_{ENG\_START\_2}$. Then, it proceeds to a step S705 and identifies cylinders, specifically determines which of the #1 through #4 cylinders 22 is in an intake stroke from data which is computed from the crank angle signal CA from the crank angle sensor 63 and the SIG signal from the SIG sensor 64 and stored in the memory of the engine controller 15 when the engine 1 previously stopped completely. Then, the routine RE7 proceeds to a step S706 and identifies the current angular position of the crankshaft 21 also stored in the memory.

After the step S706, the routine RE7 proceeds to a step S707 and determines whether change $\Delta P_{ENG\_D}$ of the desired engine power $P_{ENG\_D}$ exceeds a predetermined change $\Delta_1$ or not. The desired engine power $P_{ENG\_D}$ is determined at the step S104 of the routine RH1 the HEV controller 14 executes, and the change $\Delta P_{ENG\_D}$ is computed by differentiating the desired engine power $P_{ENG\_D}$.

When it is determined at the step S707 that the desired engine power change $\Delta P_{ENG\_D}$ is not greater than the predetermined change $\Delta_1$ (NO), which means that the engine 2 is not required to so rapidly ramp up its output, the routine RE7 proceeds to steps S708 and 709 and sets the VCT control signal $\theta_{VCT}$ and the VVL control signal $\theta_{VVL}$ to be first predetermined values $\theta_{VCT\_ST\_1}$ and $\theta_{VVL\_ST\_1}$, which are the same as set at the step S608 of the routine RE6 during the engine stopping mode. During the electric mode, the valve lift profile set in the engine stopping mode is maintained as described above, and in this case, it is not changed at all for the engine starting mode.

Then, the routine proceeds to a step S710 and sets the fuel injection pulse FP to be a first start fuel injection pulse $FP_{START\_1}$. After the step S710, the routine RE7 proceeds to a step S711, and the engine controller 15 outputs the control signals which are set during the process of the routine RE7 to the actuators and the HEV controller 14. For example, the VCT control signal $\theta_{VCT}$ is output to the VCT control system 210, the VVL control signal $\theta_{VVL}$ is output to the VVL actuator 123, and the fuel injection pulse FP set at the step S710 is output to the fuel system 46. After the step S711, the routine RE7 returns.

When it is determined at the step S707 that the desired engine power change $\Delta P_{ENG\_D}$ is greater than the predetermined change $\Delta_1$ (YES), which means that the engine 2 is required to rapidly ramp up its output, the routine RE2 proceeds to steps S712 and 713 and sets the VCT control signal $\theta_{VCT}$ and the VVL control signal $\theta_{VVL}$ to be second predetermined values $\theta_{VCT\_ST\_2}$ and $\theta_{VVL\_ST\_2}$, which are predetermined so that the closing timing of the intake valve 41 is advanced from a bottom dead center of an intake stroke, but retarded from the closing timing caused by the first values $\theta_{VCT\_ST\_1}$ and $\theta_{VVL\_ST\_1}$, and a lift of the intake valve 41 is greater than that of the first values. Then, the routine proceeds to a step S714 and sets the fuel injection pulse FP to be a second start fuel injection pulse $FP_{START\_2}$, which is greater than the first pulse $FP_{START\_1}$ set at the step S710. Then, the routine RE7 proceeds to a step S715, and the engine controller 15 sets a control signal for the fuel supply system 46 to inject fuel into one of the cylinders 22 which is in an intake stroke as identified at the step S705. After the step S715, the routine RE7 proceeds to the step S711, and the engine controller 15 outputs the control signals including that set at the step S715 as described above. Therefore, if the desired engine power change $\Delta P_{ENG\_D}$ is greater than the predetermined change $\Delta_1$, the engine 2 inducts more air into the combustion chambers 27 and gets more fuel. After the step S715, the routine proceeds to the step S716, and the engine controller 15 outputs signals as described above.

When it is determined at the step S703 that the second engine starting flag $F_{ENG\_START\_2}$ is high (=1), it means that the engine 2 is already in the engine starting mode, and the routine RE7 proceeds to a step S716 and determines whether the current engine speed $N_{ENG}$ is greater than a predetermined reference speed $N_{ENG\_START}$, which is set, for example, 1000 rpm. If it is determined at the step S716 that the current engine speed $N_{ENG}$ is not greater than the predetermined reference speed $N_{ENG\_START}$ (NO), it means that the engine 2 is not completely started up yet, and the routine RE7 proceeds to a step S717 and determines whether the crankshaft 21 of the engine 2 has passed a first dead center, which is at every 180° CA in the case of the four cylinder four stroke engine in this embodiment, based on the initial angular position of the crankshaft 21 that is identified at the step 705 and the current angular position of the crankshaft 21 detected from the crank angle sensor 63. If NO, it means that the engine has barely rotated, and the routine directly proceeds to the step S711 described above.

When it is determined at the step S717 that the crankshaft has passed the first dead center (YES), which means a first intake stroke has started, the routine RE7 proceeds to a step S718 and determines whether fuel start flag $F_{FUEL\_ST}$ is high (=1) or not. If NO at the step S717, the routine sets the flag $F_{FUEL\_ST}$ to be high at a step S719 and proceeds to a step S720. Otherwise, the routine RE7 directly proceeds to the step S720, where the engine controller 15 sets a control signal for the fuel system 46 to inject fuel to a cylinder which is in the first intake stroke and after a top dead center by a predetermined crank angle (e.g. 100° ATDC). Then, the routine proceeds to a step S721, and the engine controller 15 sets a control signal for the ignition system 44 to make a spark in a cylinder which is in a compression stroke and before a top dead center by a predetermined crank angle (e.g. 20° BTDC). Then, the routine proceeds to the step S711 described above, and output signals including the control signals set at the steps S720 and S721.

When it is determined at the step S716 that the current engine speed $N_{ENG}$ is greater than the predetermined reference speed $N_{ENG\_START}$ (NO), it means that the engine 2 is completely started up, and the routine RE7 proceeds to a step S722 and resets the second engine starting flag $F_{ENG\_START\_2}$ to be low (=0) so that the first engine starting flag $F_{ENG\_START\_1}$ is reset at the step S506 of the routine RH5 the HEV controller 14 executes. The reset flag $F_{ENG\_START\_1}$ causes at the step S702 the routine RH7 not to run. Finally, the routine RE7 proceeds to a step S723 and resets the fuel starting flag $F_{FUEL\_ST}$ to be low (=0), and then it returns. After the engine 2 is completely started under the engine starting mode routine RE7, the engine controller 15 controls the actuators of the engine 2 under the normal engine control strategy executed in the engine running mode of the HEV power-train 1.

The operation of the HEV power-train 1 will be described below. As described above, the operation is controlled by the HEV power-train controller 14 executing the control routines RH1 through RH5 and by the engine controller 15 executing the control routines RE6 and RE7.

Operation in Engine Stopping Mode

Figure 17:
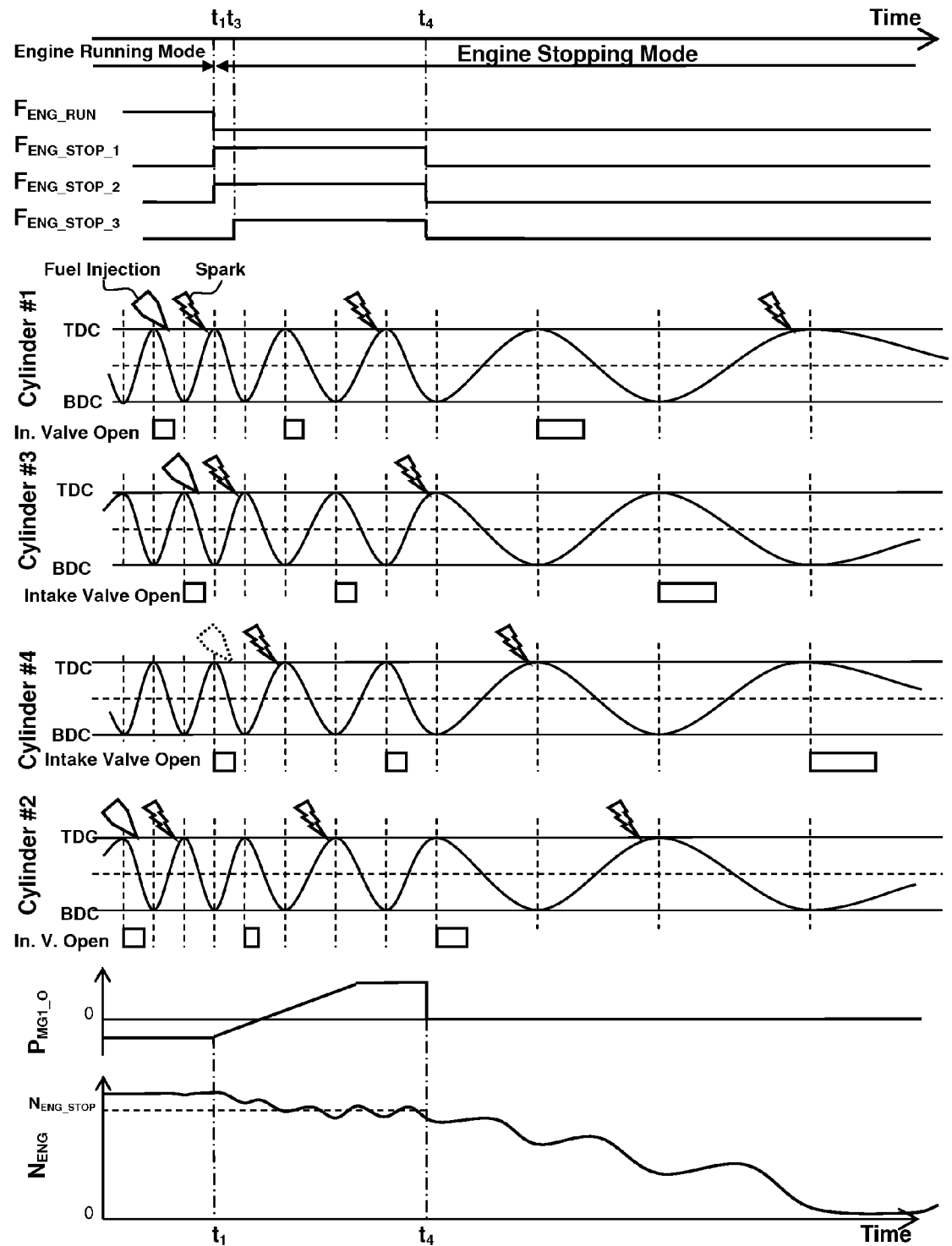
FIG. 17 is a time chart illustrating an operation of the HEV power-train during the engine stopping mode.
Figure 19:
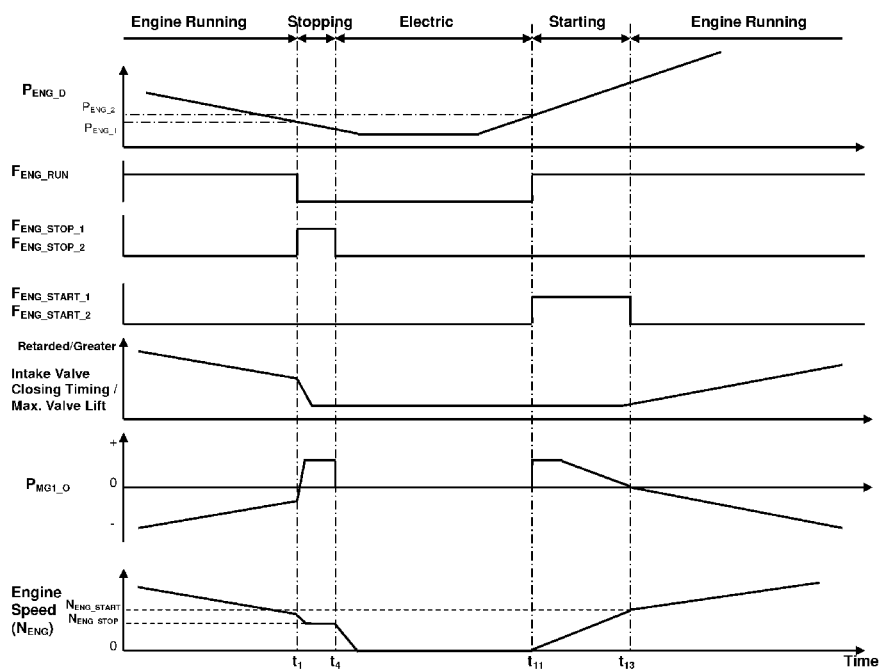
FIG. 19 is a time chart illustrating the operation of the HEV power-train during the engine running mode, the engine stopping mode, the electric mode, the engine starting mode and again the engine running mode.

Referring to FIGS. 17 and 19, there are shown changes of the various parameters processed during the engine stopping mode and described above with reference to FIGS. 10, 13 and 15. At time $t_1$, the desired engine power $P_{ENG\_D}$ is determined not greater than the first reference engine power $P_{ENG\_1}$ at the step S106 of the routine RH1 executed by the HEV controller 14 and shown in FIG. 10, and the engine running flag $F_{ENG\_RUN}$ is reset al. the step S107 and the first engine stop flag $F_{ENG\_STOP\_1}$ is set high at the step S108. At the same time, the second engine stop flag $F_{ENG\_STOP\_2}$ is set high at the step S604 of the routine RE6 executed by the engine controller 15 and shown in FIG. 15. As a result, the HEV power-train 1 has entered the engine stopping mode from the engine running mode at the time $t_1$.

During the engine running mode before the time $t_1$, the first electric machine 3 generates electricity to brake the engine 2 and achieve the operational engine speed $N_{ENG\_O}$ determined at the step S204 of the routine RH2 executed by the HEV power-train controller 14 and shown in FIG. 11. Therefore, the operational power $P_{MG1\_O}$ of the first electric machine 3 is at the negative side before the time $t_1$ as shown in FIGS. 17 and 19.

After the time $t_1$, the operational engine torque $TQ_{ENG\_O}$ is set to be zero at the step S404 of the routine RH4 executed by the HEV power-train controller 14 and shown in FIG. 13, and the engine speed tends to be reduced, but the operational engine speed $N_{ENG\_O}$ is set to be the pre-stop engine speed $N_{ENG\_STOP}$ at the step S406. Therefore, the operational power $P_{MG1\_O}$ of the first electric machine 3 will be at the positive side as can be seen from the collinear diagram of FIG. 2(B). The operational power $P_{MG1\_O}$ of the first electric machine 3 is adjusted to feedback control the engine speed $N_{ENG}$ to be the pre-stop engine speed $N_{ENG\_STOP}$ at the step S407 so that engine speed $N_{ENG}$ converges within a range from the $N_{ENG\_STOP}$ as shown in FIG. 17. Through the time $t_1$, the operational power $P_{MG1\_O}$ of the first electric machine 3 varies from the negative to positive side, and the operational power $P_{MG2\_O}$ of the second electric machine 4 varies correspondingly to the change of the first electric machine as determined at the step S410 of the routine RH4 so that the $P_{MG2\_O}$ increases as the $P_{MG1\_O}$ increases in the positive side.

At the time $t_1$, the fuel pulse FP is set to be zero at the step S606 of the routine RE6 shown in FIG. 15, and, as shown in FIG. 17, fuel injection is shut off starting with a next cylinder to be fueled after the time $t_1$, in this case, the cylinder #4. Although fuel is shut off, but spark ignition is continued as long as the engine rotates.

Also at the time $t_1$, the VCT and VVL control signals $\theta_{VCT}$ and $\theta_{VVL}$ are set to be the predetermined values $\theta_{VCT\_ST\_1}$ and $\theta_{VVL\_ST\_1}$ for engine stopping and starting which correspond to advanced closing timing and reduced maximum lift of the intake valves 41 at the steps S608 and S609 of the routine RE6 shown in FIG. 15. This valve lift profile reduces air charged in the combustion chamber 27 to, for example, 15% of the displacement of the cylinder 22 (cylinder charging efficiency is 15%). Before the time $t_1$, the HEV power-train 1 is in the engine running mode, and the cylinder charging efficiency is greatly reduced by advancing the closing timing and reducing the maximum valve lift through the time $t_1$ as can be seen from FIG. 19.

At the same time, the counter $C_1$ is initialized to be the initial value $C_{1\_INI}$ which corresponds to the actual state of the intake valves 41 at the time $t_1$ and is determined at the step S605, and started to be counted down. Then, at time $t_3$ of FIG. 17, the counter $C_1$ reaches zero and the actual state of the intake valves 41 is supposed to reach the advanced closing timing and the reduced lift corresponding to the predetermined values $\theta_{VCT\_ST\_1}$ and $\theta_{VVL\_ST\_1}$.

At the time $t_3$, the first crank angle counter $C_{CRK\_1}$ is started at the step S615 of the routine RE6 shown in FIG. 15. It counts the predetermined crank angle, for example 720° CA, at time $t_4$ in FIGS. 17 and 19. In other words, at the time $t_4$, the engine 2 is supposed to have rotated one engine cycle since the state of the intake valves reached the advanced closing timing and the reduced lift at the time $t_3$. That is, all the four cylinders 22 have had respective intake strokes take place since the time $t_3$. Therefore, at the time $t_4$, air charged in the four cylinders 22 is significantly reduced.

At the time $t_4$, the first through third engine stop flags $F_{ENG\_STOP\_1}$ through $F_{ENG\_STOP\_3}$ are all reset at the step S410 of the routine RH4 and the steps S618 and S619 of the routine RE6, and the engine stopping mode is exited to the electric mode. Then, the operational power $P_{MG1\_O}$ of the first electric machine 3 are set to be zero at the step S409 of the routine RH4 executed by the HEV controller 14 and shown in FIG. 13, the engine 2 is not driven any more, and the engine speed $N_{ENG}$ is falling as shown in FIGS. 17 and 19.

During the engine speed falling, as can be seen from the bottom graph of FIG. 17, fluctuation of the engine speed corresponding to the dead centers is reduced due to the significantly reduced air charge in the cylinders 22 and accompanying reduced compression pressure. The reduced fluctuation of the engine speed can greatly suppress a vibration of the HEV power-train 1, especially, because the engine 2 is permanently coupled to the driving wheels through the power transmission mechanism 5.

From the time $t_4$, the engine 2 or the crankshaft 21 will still rotate by about two cycles or 1440° CA in the forward rotation while decreasing the speed. Then, the crankshaft 21 will repeat forward and reverse angular movement for a while. Even during the reverse angular movement, the engine controller 15 can recognize the angular position of the crankshaft based on the signal from crank angle sensor 63 as is known in the art. Therefore, the engine controller 15 can recognize the exact angular position of the crankshaft 21 at the time of the complete stop of the engine 2 and stores the position in its memory for usage at the time of engine restarting, particularly at the step S717 of the routine RE7 shown in FIG. 16.

Operation in Engine Starting Mode

Figure 18:
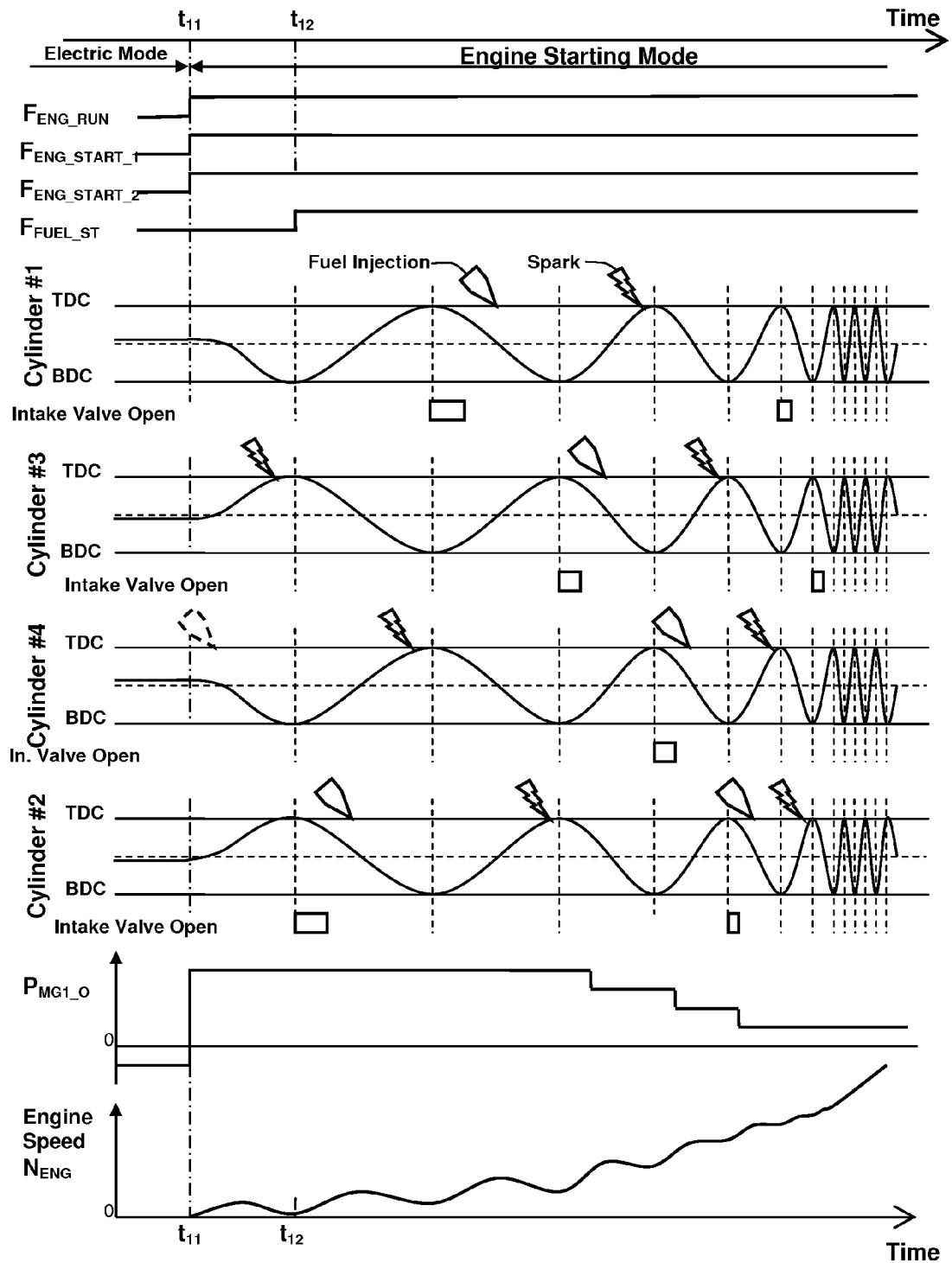
FIG. 18 is a time chart illustrating an operation of the HEV power-train during the engine starting mode.

Referring to FIGS. 18 and 19, there are shown changes of the various parameters processed during the engine starting mode described above with reference to FIGS. 10, 14 and 16. At time t1, the desired engine power $P_{ENG\_D}$ is determined greater than the first reference engine power $P_{ENG\_2}$ at the step S109 of the routine RH1 executed by the HEV controller 14 and shown in FIG. 10, and the engine running flag $F_{ENG\_RUN}$ is set al. the step S110 and the first engine stop flag $F_{ENG\_START\_1}$ is set high at the step S108. At the same time, the second engine stop flag $F_{ENG\_START\_2}$ is set high at the step S704 of the routine RE7 executed by the engine controller 15 and shown in FIG. 16. As a result, the HEV power-train 1 has enter the engine starting mode from the electric mode at the time $t_{11}$.

At the time $t_{11}$, the operational power $P_{MG1\_O}$ is supplied to the first electric machine 3 through the first inverter 12 as determined at the step S505 of the routine RH5 executed by the HEV controller 14 and shown in FIG. 14. The operational power $P_{MG1\_O}$ is set in consideration of the vehicle speed VSP and the speed ratio of the power transmission mechanism 5 so as to rotate the engine 2 at a target engine speed, for example 300 rpm. At the same time, as determined at the step S507 of the routine RH5, the operational power $P_{MG2\_O}$ is increased corresponding to the increase of $P_{MG1\_O}$, and it balances the torques $TQ_{SUN}$ and $TQ_{RING}$ between the sun gear and the ring gear of the planetary gear set 501 as can be seen in FIG. 2.

Also at the time $t_{11}$, the engine controller 15 identifies the absolute angular position of the crankshaft 21 with regard to an engine cycle at the step S706 of the routine RE7 executed by the engine controller 15 and shown in FIG. 16. After the time $t_{11}$, the ignition system 44 makes a spark at every spark timing no matter whether fuel is supplied or not as shown in FIG. 18 where the cylinder #3 gets a spark at first.

If the engine 2 is required to rapidly ramp up its output as determined at the step S707 of the routine RE7 shown in FIG. 16, the fuel injector 45 injects fuel to a cylinder which is in an intake stroke at the time $t_{11}$, for example, the cylinder #4 in FIG. 18. During the electric mode before the time t11, the intake valve 41 of the cylinder #4 is closed, but a pressure therein becomes equal to the atmospheric pressure over time due to a gap between the piston ring and the cylinder wall as known in the art. Therefore, air charged in the cylinder #4 will depend on its piston position, for example it is 45% of the cylinder displacement, in other words, charging efficiency is 45%, in the case of FIG. 18.

Otherwise, the first fuel injection is made for a cylinder which is in an exhaust stroke at the time $t_{11}$, for example, the cylinder #2 in FIG. 18. The engine controller 15 identifies a first dead center at time $t_{12}$ as determined at the step S717 of the routine RE7 and set the fuel starting flag $F_{FUEL\_ST}$ to be high at the step S719. After the time $t_{12}$, the engine controller 15 controls the fuel injector 45 and the fuel system 46 to inject fuel in an intake stroke as processed at the step S720. Therefore, the fuel is injected into a cylinder which is in an intake stroke, in this case the cylinder #2. The intake valve 41 of the cylinder #2 closes in accordance with the control signals $\theta_{VCT}$ and the VVL control signal $\theta_{VVL}$ as determined at the steps S709 and S710 so that the reduced lift and the advanced closing timing take place and charging efficiency of the cylinder #2 is much less than that of the cylinder #4, for example 15%. The supplied fuel is ignited by the spark made at the step S721 and combusted. The combustion in the cylinder #2 generates less energy due to the reduced charging efficiency. But, torque derived from the combustion energy in the cylinder #2 causes the engine speed $N_{ENG}$ to increase. As shown in FIG. 18, the HEV controller 14 reduces the operational power $P_{MG1\_O}$ of the first electric machine after the combustion as determined based on the crank angle at the step S505 of the routine RH5 shown in FIG. 14 to prevent the excessive engine speed increase. Corresponding to the decrease of the operational power $P_{MG1\_O}$ of the first electric machine, the second electric machine's operational power $P_{MG2\_O}$ is decreased accordingly as determined at the step S506 of the routine RH5.

Following the cylinder #2, the cylinder #1 goes through the same process, and then the cylinders #3 and #4 do thereby continuing until the engine speed $N_{ENG}$ exceeds the predetermined reference speed $N_{ENG\_START}$ at time $t_{13}$ (only shown in FIG. 19) as determined at the step S716 of the routine RE7 executed by the engine controller 15 and shown in FIG. 16. The operational powers $P_{MG1\_O}$ and the corresponding $P_{MG2\_O}$ are reduced in a prescribed manner, for example, in the stepped manner until the prescribed crank angle has passed as shown in FIG. 18.

At the time $t_{13}$, the first and second engine starting flags $F_{ENG\_START\_1}$ and $F_{ENG\_START\_2}$ are reset at the step S506 of the routine RH5 and the step S722 of the routine RE7, and the engine starting mode is exited to the engine running mode. After the time $t_{13}$ in the engine running mode, the engine controller 15 controls the actuators of the engine 1 in accordance with the operational engine torque $TQ_{ENG\_O}$ which is determined at the step S204 of the routine RH2 executed by the HEV controller 14 and shown in FIG. 11. The operational engine torque $TQ_{ENG\_O}$ is achieved basically by adjusting the fuel injection pulse FP. For exhaust gas emission control and other reasons, the air inducted into the engine 2 needs to be regulated corresponding to the fuel injection pulse FP usually so as to make stoichiometric air fuel mixture. The inducted air can be regulated by adjusting the control signals $\theta_{VCT}$ and $\theta_{VVL}$ for the VCT actuator 103 and the VVL actuator 123 so as to vary the maximum valve lift and the closing timing of the intake valves 41 as shown in FIG. 9. Therefore, the maximum valve lift of the intake valves 41 is increased and the closing timing of the intake valves 41 is advanced before a bottom dead center as the operational engine torque $TQ_{ENG\_O}$ is increased, as shown in FIG. 19.

Before the time $t_{13}$, the control signals $\theta_{VCT}$ and $\theta_{VVL}$ for the VCT actuator 103 and the VVL actuator 123 are set to be the values $\theta_{VCT\_ST\_1}$ and $\theta_{VVL\_ST\_1}$ or $\theta_{VCT\_ST\_2}$ and $\theta_{VVL\_ST\_2}$ for starting the engine 2, which correspond to the reduced maximum lift and the advanced closing timing of the intake valves 41 compared to the control signals during the engine running mode. In other words, after the time $t_{13}$, the maximum valve lift is greater and the closing timing is retarded compared to before the time $t_{13}$ as can be seen in FIG. 19. The change of the maximum valve lift and the closing timing also conform to the increase of the engine speed $N_{ENG}$ so that a moderate transition of the intake valve setting and engine speed increase it derives can be achieved from the transition from the engine starting mode to the engine running mode.

It is needless to say that the invention is not limited to the illustrated embodiment and that various improvements. Therefore, alternative designs are possible without departing from the substance of the invention as claimed in the attached claims, as described below.

Although the engine 2 is part of the HEV power-train 1 which couples the engine 2, the first electric machine 3, the second electric machine 4 and the driving wheels 9 through the power transmission mechanism 5 including the planetary gear set 501 in the above embodiment, the engine 2 may be coupled with a rotational machine through any power transmission apparatus, for example those two are directly coupled to each other through, for example, gears, a chain and sprockets, a belt and pulleys, and the like.

Although the first and second electric machines 3 and 4 are powered with electricity, they may be replaced with any rotational machines such as hydraulic machines and the like.

Although the fuel injector 41 of the engine 2 is arranged to inject fuel directly to the combustion chamber 27 (direct injection), it may be arranged to inject fuel in the intake port 28 (port injection). In that case, the fuel injection during the engine starting mode needs to be completed well before the closing of the intake valve 41.

The intake valve drive mechanism 101 is not limited to the type described above, but it may be of any type as long as the valve lift profile including the maximum valve lift and the closing timing can be arranged, and it may be, for example, electromagnetic valve actuators which drive the valve(s) of the respective cylinders individually by using electromagnetic force through solenoids.

The invention claimed is:

1. Method of stopping an internal combustion engine having a combustion chamber and an intake valve which opens during an intake stroke of an engine cycle to allow air to be inducted into said combustion chamber, the method comprising:

advancing closing timing of said intake valve to reduce air charged in said combustion chamber and shutting off fuel to said combustion chamber upon a request of engine stop;

maintaining a speed of said internal combustion engine within a predetermined range without supplying fuel to said combustion chamber and with said advanced closing timing of said intake valve at least for one intake stroke of said combustion chamber; and decreasing the speed of said internal combustion engine with said advanced closing timing of said intake valve from said predetermined range.

2. The method as described in claim 1, wherein the closing timing of said intake valve is advanced before a bottom dead center of an intake stroke of said combustion chamber.

3. The method as described in claim 1, further comprising:

supplying first energy to a first rotational machine to drive said internal combustion engine when the speed of said internal combustion engine is maintained within said predetermined range.

4. The method as described in claim 3, further comprising:

stopping to supply the first energy when the speed of said internal combustion engine is decreased after being maintained.

5. The method as described in claim 3, further comprising:

supplying second energy to a second electric machine to drive a vehicle wheel in response to a vehicle power demand; and increasing said second energy in response to increase of said first energy.

6. The method as described in claim 1, further comprising:

reducing a lift of said intake valve upon the request of engine stop.

7. The method as described in claim 1, wherein said internal combustion engine has a plurality of combustion chambers and intake valves, and wherein the speed of said internal combustion engine is kept within the predetermined range until intake strokes for all of said combustion chambers have taken place since the closing timing of said intake valves are advanced.

8. The method as described in claim 7, further comprising making a spark in each of said combustion chambers at predetermined timing after the request of engine stop.

9. Method of stopping an internal combustion engine having a combustion chamber and an intake valve which opens during an intake stroke of an engine cycle to allow air to be inducted into said combustion chamber, the method comprising:

reducing a lift of said intake valve and shutting off fuel to said combustion chamber upon a request of engine stop;

maintaining a speed of said internal combustion engine within a predetermined range without supplying fuel to said combustion chamber and with said reduced lift of said intake valve at least for one intake stroke of said combustion chamber; and decreasing the speed of said internal combustion engine with said reduced lift of said intake valve from said predetermined range.

10. The method as described in claim 9, further comprising:

supplying first energy to a first rotational machine to drive said internal combustion engine when the speed of said internal combustion engine is kept within said predetermined range.

11. The method as described in claim 10, further comprising:

stopping to supply the first energy when the speed of said internal combustion engine is decreased after being maintained.

12. The method as described in claim 10, further comprising:

supplying second energy to a second rotational machine to drive a vehicle wheel in response to a vehicle power demand; and increasing said second energy in response to an increase of said first electricity.

13. The method as described in claim 9, wherein said internal combustion engine has a plurality of combustion chambers and intake valves, and wherein the speed of said internal combustion engine is kept within the predetermined range until intake strokes for all of said combustion chamber have taken place since the lifts of said intake valves are reduced.

14. A power-train system comprising:
- an internal combustion engine with a plurality of combustion chambers having intake valves which opens during an intake stroke of an engine cycle to allow air to be inducted into each of said combustion chambers;
- a variable valve lift mechanism capable of variably setting lifts of said intake valves;
- a fuel supply system configured to supply fuel individually to said combustion chambers;
- a first rotational machine capable of converting rotational power from first energy and rotationally coupled to said internal combustion engine; and
- a controller configured to:
  - control said variable valve mechanism to reduce the lifts of said intake valves and said fuel supply system to shut off fuel to said combustion chambers upon a request of engine stop;
  - regulate said first energy to maintain a speed of said internal combustion engine within a predetermined range and decrease it after intake strokes for all of said combustion chambers have taken place.

15. The power-train system as described in claim 14, wherein said variable valve mechanism simultaneously sets the lifts of said intake valves for all of said combustion chambers.

16. The power-train system as described in claim 14, wherein said variable valve mechanism sets the lifts of said intake valves so that closing timing of said intake valves is advanced as the lifts are more reduced.

17. The power-train system as described in claim 14, wherein said variable valve mechanism sets the lifts of said intake valves so that maximum lifts of said intake valves are advanced as the lifts are more reduced.

18. The power-train system as described in claim 14, further comprising:
- a vehicle wheel; and
- a single gear set which consists of three rotational elements, and wherein said internal combustion engine, said first rotational machine and said vehicle wheel are coupled respectively to said three rotational elements.

19. The power-train system as described in claim 18, further comprising:
- a second rotational machine capable of converting rotational power from second energy and rotationally coupled to said vehicle wheel, and wherein said controller is further configured to increase said second energy in response to an increase of said first energy.

20. The power-train system as described in claim 19, further comprising an energy storage capable of storing energy therein and supplying energy to said first and second rotational machines.

* * * * *